United States Patent
Kang et al.

(10) Patent No.: US 11,216,839 B2
(45) Date of Patent: Jan. 4, 2022

(54) SYSTEMS AND METHODS FOR ADVANCED PROGRAMMATIC ADVERTISING TARGETING

(71) Applicant: Vungle Inc., San Francisco, CA (US)

(72) Inventors: Daniel Kang, San Francisco, CA (US); Ben Bear, San Francisco, CA (US); Zain Jaffer, San Francisco, CA (US); David Gregson, San Francisco, CA (US)

(73) Assignee: VUNGLE, INC., San Francisco, CA (US)

( * ) Notice: Subject to any disclaimer, the term of this patent is extended or adjusted under 35 U.S.C. 154(b) by 414 days.

(21) Appl. No.: 14/677,951

(22) Filed: Apr. 2, 2015

(65) Prior Publication Data
US 2016/0180377 A1 Jun. 23, 2016

Related U.S. Application Data

(60) Provisional application No. 62/095,732, filed on Dec. 22, 2014.

(51) Int. Cl.
*G06Q 30/02* (2012.01)

(52) U.S. Cl.
CPC ..... *G06Q 30/0244* (2013.01); *G06Q 30/0249* (2013.01); *G06Q 30/0251* (2013.01)

(58) Field of Classification Search
CPC .......... G06Q 30/0244; G06Q 30/0249; G06Q 30/0251
See application file for complete search history.

(56) References Cited

U.S. PATENT DOCUMENTS 8,745,647 B1 * 6/2014 Shin .................... H04N 21/812
725/9
8,775,251 B1 7/2014 Archak et al.
(Continued)

FOREIGN PATENT DOCUMENTS

CN 102203816 9/2011
CN 102663519 9/2012
(Continued)

OTHER PUBLICATIONS

Notification of International Search Report and Written Opinion , PCT/US2015/000157, dated Apr. 18, 2016, 12 pages.
(Continued)

*Primary Examiner* — David J Stoltenberg
*Assistant Examiner* — Michael J Cross
(74) *Attorney, Agent, or Firm* — Jaffery Watson Mendonsa & Hamilton LLP

(57) ABSTRACT

Methods and systems are described for providing advanced programmatic advertising targeting. In one embodiment, a system includes a storage medium to store instructions of one or more performance based algorithms and processing logic coupled to the storage medium. In response to receiving a function call from an advertising entity, the processing logic is configured to execute the instructions of the one or more performance based algorithms to analyze parameters of the function call including an advertising cost budget for an ad campaign and analyze advanced targeting data and parameters and rules for determining a customized ad campaign for the advertising entity. The advanced targeting data and parameters include device characteristics and user characteristics including at least one of conversion rate, ad engagement rate, installed software application (app) type on a user's device, and in-app purchase (IAP) activity of a user from any ad source.

20 Claims, 10 Drawing Sheets

(56) References Cited

U.S. PATENT DOCUMENTS

| | | | |
|---|---|---|---|
| 2006/0224445 A1* | 10/2006 | Axe | G06Q 30/02 705/14.69 |
| 2008/0103971 A1 | 5/2008 | Lukose et al. | |
| 2008/0215418 A1 | 9/2008 | Kolve et al. | |
| 2009/0083158 A1 | 3/2009 | Coker et al. | |
| 2010/0094704 A1 | 4/2010 | Subramanian et al. | |
| 2010/0145808 A1 | 6/2010 | Hilbert et al. | |
| 2011/0238496 A1 | 9/2011 | Gurbuxani et al. | |
| 2012/0054020 A1* | 3/2012 | Jacobs | G06Q 30/0269 705/14.42 |
| 2013/0159103 A1 | 6/2013 | Foroughi et al. | |
| 2014/0074601 A1* | 3/2014 | Delug | G06Q 30/02 705/14.53 |
| 2015/0006288 A1* | 1/2015 | Forsblom | G06Q 30/0251 705/14.54 |
| 2015/0025976 A1* | 1/2015 | Guo | G06Q 30/0267 705/14.64 |
| 2015/0178790 A1* | 6/2015 | Yi | G06Q 30/0273 705/7.31 |
| 2016/0104207 A1* | 4/2016 | Zhao | G06Q 30/0275 705/14.71 |
| 2016/0117736 A1* | 4/2016 | Dasdan | H04L 67/306 705/14.66 |

FOREIGN PATENT DOCUMENTS

| | | |
|---|---|---|
| EP | 3238154 | 11/2017 |
| EP | 3238156 | 11/2017 |
| WO | 2016/105451 | 6/2016 |
| WO | 2016/105452 | 6/2016 |

OTHER PUBLICATIONS

IAB Ad Engagement, Marisa Gluck, Radar Research, 15 pages, downloaded on Feb. 18, 2015.

Notification of International Search Report and Written Opinion, PCT/US2015/000161, dated May 13, 2016, 10 pages.

Extended European Search Report from EP Application No. 15873754. 4, 8 pages, dated Jun. 15, 2018.

Extended European Search Report received for International Application No. EP15873753, dated Jul. 30, 2018, 8 pages.

Final Office Action from U.S. Appl. No. 14/677,948, dated Feb. 9, 2018, 17 pages.

Office Action from U.S. Appl. No. 14/677,948, dated Jun. 20, 2017, 18 pages.

International Preliminary Report on Patentability for PCT Application No. PCT/US2015/000157, dated Jun. 27, 2017, 8 pages.

International Preliminary Report on Patentability for PCT Application No. PCT/US2015/000161, dated May 13, 2016, 10 pages.

Communication pursuant to Article 94(3) for EP Application No. 15 873 754.4, received May 19, 2020, 10 pages.

Office Action for U.S. Appl. No. 14/677,948, 14 pages, dated Jul. 10, 2020.

Non-Final Office Action, U.S. Appl. No. 14/677,948, dated May 3, 2021, 12 pages, USPTO.

* cited by examiner

| AD CAMPAIGN 510 | FUNCTION 520 | FUNCTION 530 | FUNCTION 540 | FUNCTION 560 | FUNCTION 570 | ... | FUNCTION n |
|---|---|---|---|---|---|---|---|
| AD CAMPAIGN 512 | COST 522 | CONVERSION RATE 532 | ID 542 | LTV 562 | ROI 572 | ... | ENGAGEMENT RATE 552 |
| AD CAMPAIGN 514 | COST 524 | CONVERSION RATE 534 | PAYER 544 | LTV 564 | ROI 574 | ... | ENGAGEMENT RATE 554 |
| AD CAMPAIGN 516 | COST 526 | CONVERSION RATE 536 | IAP 546 | LTV 566 | ROI 576 | ... | ENGAGEMENT RATE 556 |
| AD CAMPAIGN 518 | COST 528 | CONVERSION RATE 538 | IAP 548 | LTV 568 | ROI 578 | ... | ENGAGEMENT RATE 558 |
| ... | ... | ... | ... | ... | ... | ... | ... |
| AD CAMPAIGN n | COST n | CONVERSION RATE n | IAP n | LTV n | ROI n | ... | ENGAGEMENT RATE n |

| AD CAMPAIGN | FUNCTION 620 | FUNCTION 630 | FUNCTION 640 | FUNCTION 660 | FUNCTION 670 | ... | FUNCTION n |
|---|---|---|---|---|---|---|---|
| AD CAMPAIGN 610 | COST 622 | CONVERSION RATE 632 | ID 642 | LTV 662 | ROI 672 | ... | ENGAGEMENT RATE 652 |
| AD CAMPAIGN 612 | COST 624 | CONVERSION RATE 634 | PAYER 644 | LTV 664 | ROI 674 | ... | ENGAGEMENT RATE 654 |
| AD CAMPAIGN 614 | COST 626 | CONVERSION RATE 636 | IAP 646 | LTV 666 | ROI 676 | ... | ENGAGEMENT RATE 656 |
| AD CAMPAIGN 616 | COST 628 | CONVERSION RATE 638 | IAP 648 | LTV 668 | ROI 678 | ... | ENGAGEMENT RATE 658 |
| AD CAMPAIGN 618 | ... | ... | ... | ... | ... | ... | ... |
| ... | | | | | | | |
| AD CAMPAIGN n | COST n | CONVERSION RATE n | IAP n | LTV n | ROI n | ... | ENGAGEMENT RATE n |

FIG. 6

SYSTEMS AND METHODS FOR ADVANCED PROGRAMMATIC ADVERTISING TARGETING

RELATED APPLICATIONS

This application claims the benefit of U.S. Provisional Application No. 62/095,732, filed on Dec. 22, 2014, the entire contents of which are hereby incorporated by reference.

This application is related to application Ser. No. 14/677,948, filed Apr. 2, 2015, entitled: SYSTEMS AND METHODS FOR PROVIDING PROGRAMMATIC CREATION AND MODIFICATION OF ADVERTISING CAMPAIGNS, which is incorporated by reference in its entirety herein.

FIELD OF THE INVENTION

Embodiments of the invention are generally related to systems and methods for advanced programmatic advertising targeting.

BACKGROUND

Mobile advertising is a form of advertising via mobile (wireless) phones or other mobile devices. Advertisements (ads) can be presented to the intended user in the form of banner ads, text boxes, and video ads. However, these ads may be difficult to distribute to a targeted user in a timely manner and the user may not be responsive and interested in the ads. Advertisers can create an advertising campaign as a series of advertisement messages that share a single idea and theme. The advertising campaigns appear in different media across a specific time frame. However, advertisers may lack the resources and expertise for effectively creating an ad campaign and delivering the ad campaign to mobile devices.

SUMMARY

Methods and systems are described for providing advanced programmatic advertising targeting. In one embodiment, a system includes a storage medium to store instructions of one or more performance based algorithms and processing logic coupled to the storage medium. In response to receiving a function call from an advertising entity, the processing logic is configured to execute the instructions of the one or more performance based algorithms to analyze parameters of the function call including an advertising cost budget for an ad campaign and analyze advanced targeting data and parameters and rules for determining a customized ad campaign for the advertising entity. The advanced targeting data and parameters include device characteristics and user characteristics including at least one of conversion rate, ad engagement rate, installed software application (app) type on a user's device, and in-app purchase (IAP) activity of a user from any ad source.

In one example, the device characteristics include device identification and device age with respect to a time period in which the device is identified by the system. The conversion rate is used to divide users into different groups based on the conversion rate for the users. An ad category conversion rate indicates a probability for a conversion occurring for a user for a particular app category. The app type may target users having competitor apps installed or users that have a particular application installed. The rules include a return on investment (ROI) parameter for the ad campaign based on the advertising cost budget. The ad campaign delivers video ads to users of mobile devices.

Other embodiments are also described. Other features of embodiments of the present invention will be apparent from the accompanying drawings and from the detailed description which follows.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

FIG. 5 illustrates an exemplary user interface for programmatic creation of advertising campaigns in accordance with one embodiment.

FIG. 6 illustrates an exemplary user interface for programmatic modification of advertising campaigns in accordance with one embodiment.

DETAILED DESCRIPTION

Figure 1:
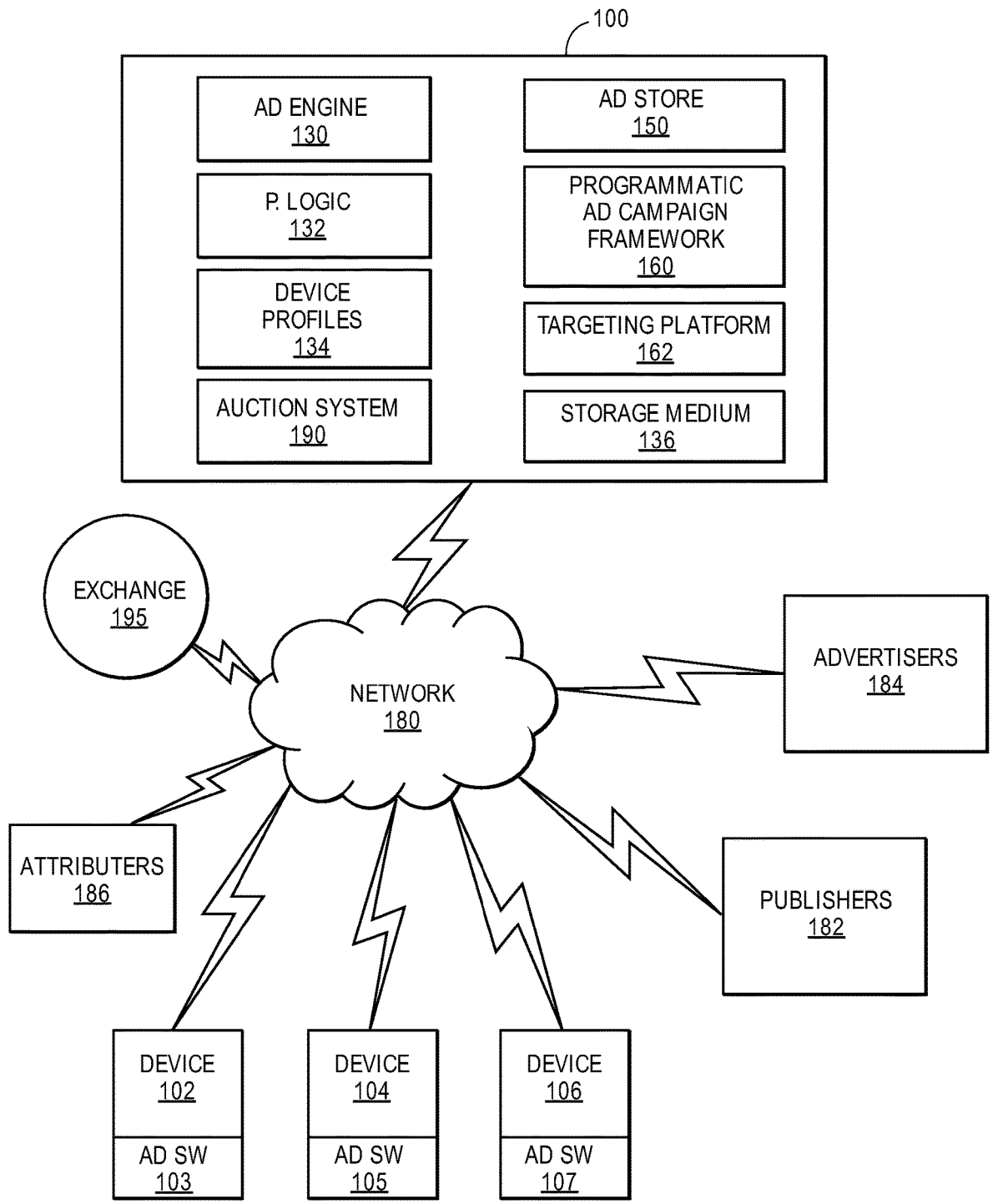
FIG. 1 shows an embodiment of a block diagram of a system 100 for providing programmatic creation and modification of advertising campaigns in accordance with one embodiment.

Methods and systems are described for providing advanced programmatic advertising targeting. In one embodiment, a system includes a storage medium to store instructions of one or more performance based algorithms and processing logic coupled to the storage medium. In response to receiving a function call from an advertising entity, the processing logic is configured to execute the instructions of the one or more performance based algorithms to analyze parameters of the function call including an advertising cost budget for an ad campaign and analyze advanced targeting data and parameters and rules for determining a customized ad campaign for the advertising entity. The advanced targeting data and parameters include device characteristics and user characteristics including at least one of conversion rate, ad engagement rate, installed software application (app) type on a user's device, and in-app purchase (IAP) activity of a user from any ad source.

An auction system provides a mechanism for third party participants to bid on providing advertising services including in-application (in-app) advertising services (e.g., advertising services delivered within mobile applications, advertising services delivered within non-web browser applications) to the device in response to an actual or predictive ad exchange request. The auction system captures demand for providing advertising services in real time or near real time prior to the actual or the predicted ad play event on the device.

In mobile video advertising, high performing campaigns are needed for advertisers, publishers, and users of the publishers. Advertisers include organizations that pay for advertising services including ads on a publisher network of applications and games. Publishers provide content for users. Publishers can include developers of software applications, mobile applications, news content, gaming applications, sports news, etc. The publishers are interested in generating revenue through selling ad space to be on displayed in video ads to their users.

Performance can be defined in terms of click-through rates (CTR), conversion rates, and video completion rates. The process in which a user selects an ad is referred to as a click-through, which is intended to encompass any user selection. The ratio of a number of click-throughs to a number of times an ad is displayed is referred to as the CTR of the ad. A conversion occurs when a user performs a transaction related to a previously viewed ad. For example, a conversion may occur when a user views a video ad and installs an application being promoted in the video ad. A conversion may occur when a user views a video ad and installs an application being promoted in the video ad within a certain time period. A conversion may occur when a user is shown an ad and decides to make a purchase on the advertiser's web site within a certain time period. The ratio of the number of conversions to the number of times an ad is displayed is referred to as the conversion rate. A video completion rate is a ratio of a number of video ads that are displayed to completion to a number of video ads initiated on a device. Advertisers may also pay for their ads through an advertising system in which the advertiser bid on ad placement on a cost-per-click (CPC), cost-per-mille (CPM), cost-per-completed-view (CPCV), cost-per-action (CPA), and/or cost-per-install (CPI) basis. A mille represents a thousand impressions.

In this section several embodiments of this invention are explained with reference to the appended drawings. Whenever the shapes, relative positions and other aspects of the parts described in the embodiments are not clearly defined, the scope of the invention is not limited only to the parts shown, which are meant merely for the purpose of illustration.

FIG. 1 shows an embodiment of a block diagram of a system 100 for providing programmatic creation and modification of advertising campaigns in accordance with one embodiment. The ad system 100 includes an advertising engine 130, processing logic 132, device profiles 134, storage medium 136, an auction system 190, an ad store 150, and a programmatic ad campaign framework 160 for providing programmatic creating and modification of ad campaigns (e.g., ad campaigns for delivering video ads to mobile devices, ad campaigns for delivering video ads to any type of device). The auction system 190 may be integrated with the ad system or separate from the ad system. The auction system 190 may include different types of auctions including cost-per-install (CPI), cost-per-click (CPC), cost-per-mille (CPM), cost-per-action (CPA), second price auction, and an ad exchange auction. The system 100 provides advertising services for advertisers 184 or publishers 182 to devices 102, 104, and 106 (e.g., source device, client device, mobile phone, tablet device, lap top, computer, connected or hybrid television (TV), IPTV, Internet TV, Web TV, smart TV, satellite device, satellite TV, automobile, airplane, etc.) via a network 180. A device profile for a device is based on one or more parameters including location (e.g., GPS coordinates, IP address, cellular triangulation, etc.) of the device, a social profile for a user of the device, and categories or types of applications installed on the device.

A targeting platform 162 includes different parameters for targeting users including individual users in ad campaigns and may include one or more performance based algorithms that utilized these different parameters for creating a performance based ad campaign. Alternatively, the performance based algorithms may be included in the ad engine 130 and obtain data from the targeting platform for creating a performance based ad campaign. The parameters include device characteristics (e.g., device id, device age, OS type, network connection for user's device, whether user's device is mobile device or tablet device, volume, screen size and orientation, language setting, etc.) and user characteristics (e.g., user spend, conversion rate, engagement rate, app type, in-app purchase (IAP) activity, etc.) from any source including the system 100, attributers 186, advertisers 184, and publishers 182. The conversion rate (or predicted conversion rate) may be used to divide users into different groups based on the conversion rate. A category conversion rate can indicate how likely a conversion occurs for a user with a particular app category (e.g., sports games, war games, quest games, news content apps, restaurant apps, fashion apps, travel apps, business apps, etc.). An engagement rate is used to target users having a high or strong ad engagement during ad play events. An app type may target users having competitor apps installed or users that have a particular "X" app installed. The competitor apps are competitors of publishers or developers that want to advertise to users of the competitor apps. The IAP activity targets users with IAP activity as indicated by user data from the system's 100 data pipeline.

Users with IAP activity can be separated into groups based on spend ranges (e.g., $10-50 range, $50-100 range, $100 or more range, etc.). The device age can be used to target new devices with respect to the system 100. Additional parameters include segments of users such as non-payers versus payers, social influence based on social media data, organic app installs, and life time value (LTV) of a user. The targeting platform is used to support advertisers with complex bid strategies for their user acquisition campaigns.

Each device includes a respective advertising services software 103, 105, 107 (e.g., a software development kit (SDK)) that includes a set of software development tools for advertising services including in-app advertising services. (e.g., advertising services delivered within mobile applications, advertising services delivered within non-web browser applications). In-app ad campaigns are ad campaigns (e.g., video ads) served to devices in-app (e.g., within mobile applications on a mobile device, within non-web browser software applications on a device, etc). The publishers 182 (or developers) publish content along with selling ad space to advertisers. Attributers 186 may install software (e.g., software development kits of publishers) on client devices and track user interactions with publisher and developer applications and advertisements. The attributers can then share this user data and device data with the system 100 and the appropriate publishers and advertisers. The system 100 uses this user and device data for analytics, data science, and return on investment advertising modeling. The system 100, devices 102, 104, 106, advertisers 184, publishers 182, attributers 186, and an ad exchange 195 with third party exchange participants communicate via a network 180 (e.g., Internet, wide area network, WiMax, satellite, cellular, IP network, etc.). The third party exchange participants can bid in real time or approximately in real time (e.g., 1 hour prior to an ad being played on a device, 15 minutes prior to an ad being played on a device, 1 minute prior to an ad being played on a device, 15 seconds prior to an ad being played on a device, less than 15 seconds prior to an ad being played on a device, less than 1 second prior to an ad being played on a device) using the auction system 190 to provide advertising services (e.g., an in-app video ad that includes a preview (e.g., video trailer) of an application, in-app ad campaigns for brand and performance advertisers) for the devices. The processing logic 132 may include a filtering functionality for filtering potential available ad campaigns, an optimizer functionality for determining an optimal ad campaign, and a selector (picker) functionality for selecting an optimal campaign. The filtering functionality may filter ad campaigns based on availability, device characteristics (e.g., device profiles 134), and user characteristics (e.g., age, gender, ethnicity, location, etc.), etc.

Advertisers 184 or publishers 182 (or developers) can programmatically access the programmatic ad campaign framework 160 for creating and modifying ad campaigns (e.g., ad campaigns for delivering video ads to mobile devices, ad campaigns for delivering video ads to any type of device) via a network 180. The ad campaign(s) are then delivered from any ad source to the targeted user devices (e.g., 102, 104, 106) via the network 180. The programmatic ad campaign framework 160 includes application programming interfaces (APIs) and implementing components. An API is a set of routines, protocols, and tools for building software applications. The API specifies how software components should interact. The Advertisers 184 or publishers 182 (or developers) obtain programmatic ad campaign software from the system 100 and then use this software for accessing the programmatic ad campaign framework 160. The programmatic ad campaign software sends functions calls with parameters to one or more APIs of the programmatic ad campaign framework 160. These APIs communicate with implementing software components of the framework 160. The implementing software components (e.g., software libraries) provide a set of functionalities for creating and modifying ad campaigns. The APIs then send function calls or responses to the programmatic ad campaign software of the advertisers or publishers via network 180. In this manner, the advertisers or publishers can programmatically create and modify ad campaigns using the ad system 100 which has improved computer functionality in the form of the programmatic ad campaign framework based on directly receiving input from the advertisers or publishers for creating a custom ad campaign for targeting users having predicted life time values greater than a threshold life time value (LTV).

In contrast, conventional ad campaigns are created with an advertiser or publisher talking with numerous ad sales, ad development, and ad creative staff for the ad system. The sales, ad development, and ad creative staff must then use different internal tools of the ad system to create the ad campaign for the advertiser or publisher. The advertiser or publisher then needs to review the created ad campaign and provide feedback for revisions of the ad campaign. The ad system works in a more efficient and streamlined manner based on the advertisers and publishers being able to directly access the ad tools of the ad system and create or modify their own custom ad campaigns in a time sensitive manner with minimal delay.

The targeting platform 162 also provides advanced targeting as described herein for improved targeting computer functionality. The targeting platform 162 allows an advertising entity (e.g., advertiser, ad agency, publisher, developer, etc.) to utilize one or more performance based algorithms to more quickly locate and target specific users even individual users based on objectives of the ad campaign such as users having predicted life time values greater than a threshold life time value (LTV). High conversion users and high lifetime value users are examples of users having predicted life time values greater than a threshold LTV. High conversion users may convert more than a threshold conversion percentage (e.g., more than 10%, more than 30%, more than 50%, etc.) for an ad campaign. High lifetime value users are predicted to have a LTV greater than a threshold LTV (e.g., greater than $50, greater than $100, etc.) for an ad campaign. In another example, an objective of the ad campaign includes a return on investment (ROI) for the ad campaign.

The targeting platform 162 can focus on more important parameters (e.g., high conversion users, high lifetime value users) and devalue or ignore other parameters to perform the processing operations in a shorter time period. Ad campaigns for delivering video ads to client devices via a network 180 can be adapted based on the engagement of the user. For example, a user that does not interact with an ad can be sent ads more frequently while a user that does interact with an ad can be sent ads less frequently.

In one embodiment, the system 100 includes a storage medium 136 to store one or more software programs. Processing logic (e.g., 132) is configured to execute instructions of at least one software program including executing the instructions of the one or more APIs and software components to receive a function call from an ad campaign software of an advertising entity, to provide a set of functionality for programmatically creating an ad campaign and programmatically modifying an ad campaign, and generating a response that is sent to the ad campaign software of the advertising entity. The response includes one or more function calls with parameters including cost information for targeting users having predicted life time values greater than a threshold life time value (LTV) for a type of ad campaign.

Figure 2:
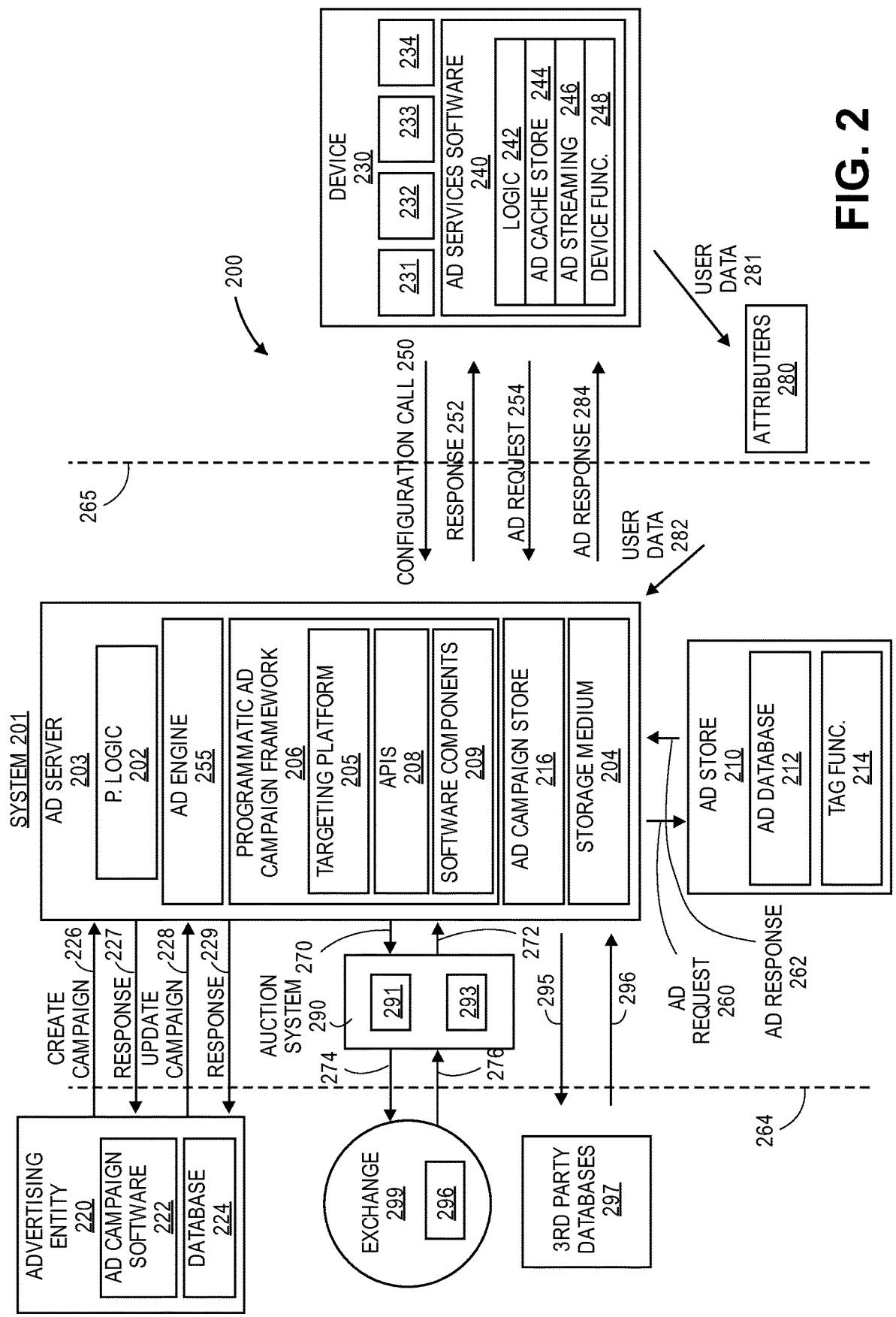
FIG. 2 illustrates a flow diagram of operations for providing programmatic creation and modification of advertising campaigns via a network in accordance with one embodiment.

FIG. 2 illustrates a flow diagram of operations for providing programmatic creation and modification of advertising campaigns via a network in accordance with one embodiment. The advertising operational flow of an ad system may be executed by an apparatus or system, which includes processing circuitry or processing logic. The processing logic may include hardware (circuitry, dedicated logic, etc.), software (such as is run on a general purpose computer system or a dedicated machine or a device), or a combination of both. In one embodiment, a system performs the operations of method 200. In one example, the vertical dashed lines 264 and 265 represent a separation of the components of the system 201 (e.g., ad server 203, auction system 290, ad store 210) and components external to the system 201 (e.g., device 230, attributers 280, exchange 299, third party databases 297). The components of the system 201 communicate with the components external to the system via a network (e.g., network 180).

An advertising entity (e.g., advertiser, ad agency, publisher, developer, etc.) 220 uses ad campaign software 222 for creating and modifying advertising campaigns (e.g., ad campaigns for delivering video ads to mobile devices via a network, ad campaigns for delivering video ads to any type of device (e.g., source device, client device, mobile phone, tablet device, lap top, computer, connected or hybrid television (TV), IPTV, Internet TV, Web TV, smart TV, etc) via a network). The ad campaign software 222 sends a function call 230 (e.g., create campaign function call) to the system 201 at operation 230. The function call includes different parameters including an identification for identifying the advertising entity and an identification for identifying an ad campaign to be created. One or more APIs 208 of the programmatic ad campaign framework 207 receives the function call from the ad campaign software 222. Parameters of the function call and data control information are transferred to software components 209, which respond by providing a set of functionality for creating an ad campaign. A response is sent from the one or more APIs to the ad campaign software 222 at operation 227. The response includes one or more function calls with return values and parameters in response to the function call received from the ad campaign software. The parameters of the response may include an identification of the ad campaign (e.g., ad campaign 1), and features or functions of the ad campaign. The ad campaign software 222 will display a user interface or dashboard for customizing the ad campaign. The created ad campaign can be saved in the database 224 and also in the ad campaign store 216. The ad campaign may utilize ads from any source including database 224, an ad store 210, third party databases 297, etc. The ad campaign framework 207 includes inversion of control such that an overall program flow is dictated by the framework not the caller (e.g., advertising entity). The framework also includes default behavior and can be extended by a user to provide specific functionality. The framework includes non-modifiable framework code that is not to be modified but does allow user-implemented extensions.

The ad campaign software 222 can also update an ad campaign at operation 228 by sending a function call (e.g., update campaign function call) to the system 201 via a network. One or more APIs 208 of the programmatic ad campaign framework 206 receives the function call from the ad campaign software 222. Parameters of the function call and data control information are transferred to the software components 209, which respond by providing a set of functionality for updating the ad campaign. A response is sent from the one or more APIs to the ad campaign software 222 at operation 229. The response includes one or more function calls with return values and parameters in response to the function call received from the ad campaign software. The parameters of the response may include an identification of the ad campaign (e.g., ad campaign 1.1), and features or functions of the ad campaign.

A targeting platform 205 may be integrated with the ad campaign framework 206 or separate from the ad campaign framework 206. The targeting platform includes different parameters for targeting users in ad campaigns and may include one or more performance based algorithms that utilize these different parameters for creating an ad campaign. Alternatively, the performance based algorithms may be located in the ad engine 255. For example, the ad campaign framework 206 may access data, parameters, or algorithms from the targeting platform or ad engine for creating and modifying ad campaigns. The parameters include device characteristics (e.g., device id, device age) and user characteristics (e.g., user spend, conversion rate, engagement rate, app type, IAP activity, predicted user LTV, etc.) from any source including the system 100, attributers 186, advertisers 184, and publishers 182. Additional parameters include segments of users such as non-payers versus payers, social influence based on social media data, organic app installs, and life time value (LTV) of a user.

A device 230 (e.g., source device, client device, mobile phone, tablet device, lap top, computer, connected or hybrid television (TV), IPTV, Internet TV, Web TV, smart TV, etc) initiates a software application (e.g., at least one of software applications 231-234). For example, a user may select one of the software applications. The advertising services software 240 is also initiated upon the initiation of one of the software applications. The advertising services software 240 may be associated with or embedded with the software applications. The advertising services software 240 may include or be associated with logic 242 (e.g., communication logic for communications such as an ad request), an ad cache store 244 for storing one or more ads or ad campaigns, ad streaming functionality 246 for receiving, optionally storing, and playing streamed ads, and device functionality 248 for determining device and connection capabilities (e.g., type of connection (e.g., 4G LTE, 3G, WiFi, WiMax, etc.), bandwidth of connection, location of device, type of device, display characteristics (e.g., pixel density, color depth), etc.). The initiated software application or advertising services software may have an ad play event for displaying or playing an ad on the display of the device. At operation 250, processing logic 202 of an ad server 204 of system 201 receives a configuration call from the device 230 via a network upon the initiation of the software application and associated advertising services software 240. At operation 252, the processing logic 202 sends a response that includes at least one configuration file to the device 230 in response to the configuration call. The at least one configuration file includes different options for obtaining an ad to play for the ad play event. In one embodiment, a first option includes playing at least one ad that is cached on the device 230 during the ad play event. A second option includes planning to play at least one ad that is cached on the device 230 but asking for at least one better ad from the system 201. If the system 201 obtains and delivers at least one better ad in a timely manner (e.g., in time for a predicted ad play event, within a time period set by the at least one configuration file) then the at least one better ad will play during the predicted ad play event. The at least one better ad is expected to have a higher conversion rate or higher likelihood of obtaining a user interaction than the at least one cached ad. Otherwise, the cached ad is played. A third option includes planning to play at least one ad that is cached on the device 230 but asking for at least one better ad from the exchange 299. If the exchange 299 including third party databases 296 provides at least one better ad in a timely manner then the better ad will play during the ad play event. Otherwise, the cached ad is played. A fourth option includes planning to play at least one ad that is cached on the device 230 but asking for at least one better ad from the system 201 or the exchange 299. If the system 201 or the exchange 299 provide at least one better ad in a timely manner then the better ad will play during the ad play event. Otherwise, the cached ad is played.

A fifth option includes streaming at least one ad to be played during the predicted ad play event to the device 230. A sixth option includes planning to play at least one ad that is streamed to the device 230 but asking for at least one better ad from the system 201. If the system 201 provides the at least one better ad in a timely manner (e.g., in time for the ad play event, within a time period set by the configuration file) then the better ad will play during the ad play event. Otherwise, the planned streamed ad is played. A seventh option includes planning to play at least one ad that is streamed to the device 230 but asking for at least one better ad from the exchange 299. If the exchange 299 provides a better ad in a timely manner then the better ad will play during the ad play event. Otherwise, the planned streamed ad is played. An eighth option includes planning to play at least one ad that is streamed to the device 230 but asking for at least one better ad from the system 201 or the exchange 299. If the system 201 or the exchange 299 provide a better ad in a timely manner then the better ad will play during the predicted ad play event. Otherwise, the planned streamed ad is played. In others embodiments, the configuration file includes a subset of the options 1-8, additional options for obtaining at least one ad or ad campaign, or different options (e.g., options that include potential caching and streaming operations).

The configuration file can be altered by the system 201 or the device 230 without affected the advertising services software 240. In particular, the configuration file can be altered without affecting a version of the advertising services software 240 such that a user does not need to update a version of the advertising services software even if the configuration file changes. The system 201 is designed to deliver the most relevant and highest converting ads to devices via a network using the configuration file.

At operation 254, prior to a predicted ad play event or an actual ad play event, the processing logic of the ad server optionally receives an ad request with a configurable option (e.g., options 1-8) of the at least one configuration file based on an anticipated ad play event occurring in the near future (e.g., 1 hr, 15 minutes, 60 seconds, 10 seconds, etc.). The ad request may be a predictive ad request if it occurs prior to a predicted ad play event. Alternatively, the ad server generates an ad request based on receiving the configuration call, which indicates that the user has initiated a software application and an anticipated ad play event will likely occurring in the near future even though no ad request is received from the device.

The ad request includes different types of information including publisher settings (e.g., a publisher of the selected software application), an application id to identify the selected software application, placement information for timing placement of an ad in-app (e.g., within mobile applications on a mobile device, within non-web browser software applications on a device, etc), user characteristics, device characteristics (e.g., device id), geographical data, location data, motion data (e.g., motion data from an accelerometer or gyroscope), language, time, application settings, demographic data for the user of the device, session data (e.g., how long a user has been using the selected application), and cache information. The ad server processes the ad request to determine an ad format and timing placement (e.g., an optimal ad format in terms of likelihood of converting, an optimal timing placement in terms of likelihood of converting) of at least one ad or interstitial ad played in-app within an initiated software application (e.g., any type of software application, non-web browser software applications) based on the information contained in the predictive ad request. The ad server determines an ad format and timing placement that is most likely to convert or generate revenue for a publisher or a developer.

Attributers 280 may have software (e.g., a SDK of the publisher of the application) installed on the user's device in order to obtain third party user data (e.g., user data 281 from the device 230). This user data may include tracking of a user's interaction and engagement with the software application, a length of time that the application is installed, an amount of purchases from the application, and buying patterns in terms of which products or services are purchased and when these products or services are purchased. The user data may also include monitoring target goals for how the user engages with the application. The user data (e.g., user data 282) can be shared with system 201, publishers, and advertisers via a network.

The ad server also processes the ad request (or predictive ad request) and accesses at least one of the ad store 210 and the exchange 299 for options 2-8 of the at least one configuration file to obtain at least one ad or ad campaign that is likely or most likely to convert. The ad server may determine which option of options 1-8 will be processed or enabled for processing the ad request (or predictive ad request) based on one or more configurable parameters. Alternatively, the device or user may determine which option of options 1-8 will be processed or enabled based on these parameters.

For option 1, the device plays at least one ad from cache. For options that access the ad store 210, at operation 260, the processing logic 202 sends an ad call or request (or a predictive ad call or request) to the ad store 210 of the system 201. The ad store includes an ad database 212 having ad campaigns and ads. The ad database 212 may be a first party ad database, i.e., a database of system 201. The ad store may optionally provide access to third party ad databases 297 via tag functionality 214. The tag functionality 214 generates or stores an ad serving tag for accessing one or more third party ad databases 297. The ad campaigns and ads are capable of being streamed to ad streaming 246 of the device or saved in an ad cache store 240 of the device.

At operation 262, the ad server receives an ad response from the ad store 210 in response to the ad call or request (or predictive ad call or request). The ad response includes a payload with one or more potential ads or ads campaigns for being streamed to the device 230 via a network or optionally an ad serving tag for accessing one or more third party ad databases 297. If the ad server receives an ad serving tag, then the ad server sends an ad request (or predictive ad request) to the third party database at operation 295 and receives an ad response (or predictive ad response) at operation 296 from the third party database 297. The ad response from the ad store or the third party databases 297 includes one or more ads or ad campaigns for being sent or streamed to the device 230. The processing logic 202 decides whether to stream at least one ad or ad campaign to the device 230 via a network based on the determined or selected option of the at least one configurable file.

The ad server upon processing an ad request (or a predictive ad request) may access the exchange 299 given certain options (e.g., options 3, 4, 7, and 8) of the at least one configuration file. In this case, the ad server sends an exchange request (or a predictive exchange request 270) to the auction system 290 having an auction engine 291 and database 293 prior to a predicted ad play event or actual ad play event on the device. Alternatively, the auction system is integrated with the ad system 201. The auction engine 291 processes the ad exchange request 270 and generates an auction based on different business rules including at least one of a price (e.g., a floor or lowest price for the ad or ad campaign), inventory allocation, and participants who can participate in the auction.

In one embodiment, the auction is a second price auction in which each participants gives their highest price (e.g., $10 per app install) and the highest bidder pays the price of the second highest bidder (e.g., $8 per app install). The advantage of this monetization model is that advertisers only bid the maximum that they are willing to pay for a set of conditions. In the scenario where another bidder's maximum price is significantly lower, the highest bidder only gets charged the second highest price of the auction. This encourages advertisers to bid actual or real market value for inventory while giving advertisers a chance to spend significantly less.

The auction determines which participant can provide a better ad for the device in a timely manner. At operation 274, the auction system 290 sends an ad exchange request (or a predictive ad exchange request to each participant of the auction). The ad exchange request (or predictive ad exchange request) includes configurable parameters including at least one of ad length, bit rate for playing the ad, ad categories, age ratings, a limit for a number of redirects to minimize latency, and the floor price. The configurable parameters are designed to enhance a user experience (e.g., by minimizing latency) and provide safety for the user based on the age rating. One or more participants then respond with an ad exchange response (or a predictive ad exchange response) at operation 276. The auction engine processes the ad exchange responses (or predictive ad exchange responses) (bids) and determines which participant(s) if any will serve a better ad for playing on the device for an actual ad play event (or a predicted ad play event). The responses and ads from the participants can be saved in the database 293. At operation 272, an ad response (or a predictive ad response) is sent from the auction engine to the ad server. The ad server then processes the ad from a winning or selected participant as determined by the auction system. In this case, the ad server unpacks the payload of the ad and converts a format of the ad (if necessary) into a standard format (e.g., xml standard, digital video ad serving template (VAST)) for ads served by the ad server. The ad server can compare a better ad from the winning or selected participant from the exchange or possibly any of the bids from the exchange with a cached ad on the device and a better ad obtained with an ad response from the ad store. At operation 284, the ad server can then select at least one better ad from the ad store, a participant with a winning or selected bid from the exchange, a cached ad on the device, or optionally a third party database 297 that has not participated in the exchange. A better ad is anticipated to be more likely to convert or have a higher likelihood of obtaining a user interaction than the cached ad on the device. The at least one better ad if selected is then cached on the device or streamed to the device via a network and played during the actual ad play event or a predicted ad play event that has been predicted to occur.

Figure 3:
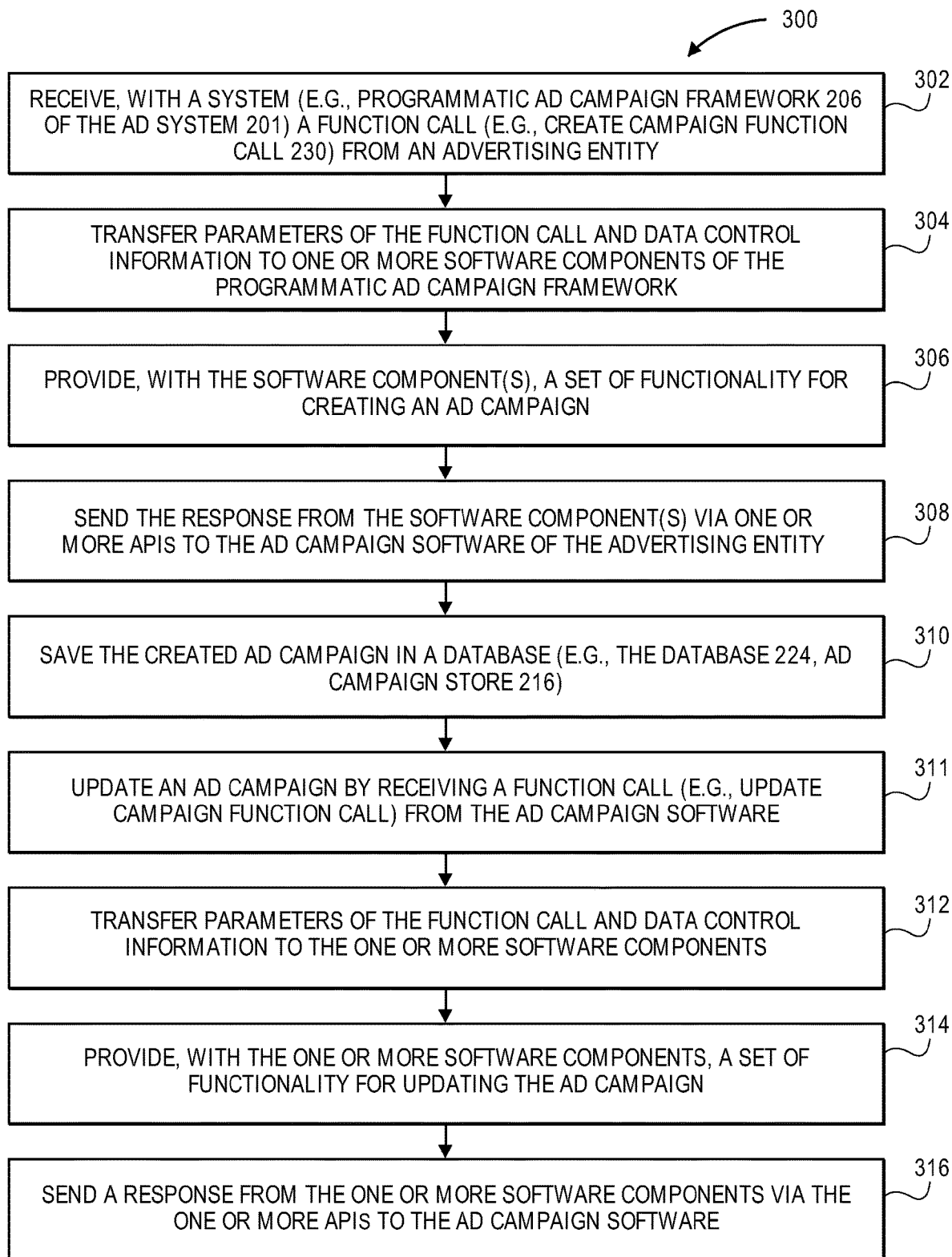
FIG. 3 illustrates flow diagrams of operations for a method of providing programmatic creation and modification of advertising campaigns via a network in accordance with one embodiment.

FIG. 3 illustrates a flow diagram of operations for a method of providing programmatic creation and modification of advertising campaigns via a network in accordance with one embodiment. The advertising operational flow of an ad system may be executed by an apparatus or system, which includes processing circuitry or processing logic. The processing logic may include hardware (circuitry, dedicated logic, etc.), software (such as is run on a general purpose computer system or a dedicated machine or a device), or a combination of both. In one embodiment, a system performs the operations of method 300 by executing instructions (e.g., framework code) of a programmatic ad campaign framework. The system communicates with an advertising entity via a network (e.g., network 180).

An advertising entity (e.g., advertiser, ad agency, publisher, developer, etc.) 220 uses ad campaign software 222 to access the programmatic ad campaign framework for creating and modifying advertising campaigns (e.g., ad campaigns for delivering video ads to mobile devices via a network, ad campaigns for delivering video ads to any type of device via a network) via a network. A system (e.g., programmatic ad campaign framework 206 of the ad system 201) receives a function call (e.g., create campaign function call 230) from the advertising entity via a network at operation 302. The advertising entity may be using ad campaign software 222. The function call includes different parameters including an identification for identifying the advertising entity and an identification for identifying an ad campaign to be created. One or more APIs of the programmatic ad campaign framework of the system receives the function call. Parameters of the function call and data control information are transferred to one or more software components of the programmatic ad campaign framework at operation 304. The software component(s) respond by providing a set of functionality for creating an ad campaign at operation 306. The set of functionality may include different parameters based on user or device characteristics including an operating system (OS) type, cost information for a bid or cost type (e.g., $10 for CPI), a threshold LTV (e.g., $50 threshold LTV, $100 threshold LTV) for targeting users having predicted life time values greater than the threshold LTV, a conversion rate for representing a likelihood of user ad interaction or conversion, a payer or non-payer category, an in-app (e.g., within mobile applications, within non-web browser applications) purchase (IAP) parameter, an engagement rate, etc. Any of the parameters included in the targeting platform may also be accessed and provided as the set of functionality. A response is sent from the software component(s) via the one or more APIs to the ad campaign software of the advertising entity via a network at operation 308.

The response includes one or more function calls with return values and parameters in response to the function call received from the ad campaign software. The parameters of the response may include an identification of the ad campaign (e.g., ad campaign 1), and features or functions of the ad campaign. The ad campaign software will display a user interface or dashboard for customizing the ad campaign. The created ad campaign can be saved in a database (e.g., the database 224, ad campaign store 216) at operation 310. The ad campaign may utilize ads from any source including database 224, an ad store 210, third party databases 297, an ad exchange 195, etc.

The system can also optionally update an ad campaign at operation 311 by receiving a function call (e.g., update campaign function call) from the ad campaign software. One or more APIs of the programmatic ad campaign framework receives the function call from the ad campaign software 222. Parameters of the function call and data control information are transferred to the one or more software components at operation 312. The one or more software components respond by providing a set of functionality for updating the ad campaign at operation 314. The set of functionality to be updated may include any of the parameters discussed herein including an operating system (OS) type, cost information for a bid or cost type (e.g., $10 for CPI), a conversion rate for representing a likelihood of user ad interaction or conversion, a payer or non-payer category, an in-app purchase (IAP) parameter, an engagement rate, a threshold LTV (e.g., $50 threshold LTV, $100 threshold LTV) for targeting users having predicted life time values greater than the threshold LTV, a ROI function or parameter, etc. A response is sent from the one or more software components via the one or more APIs to the ad campaign software at operation 316. The response includes one or more function calls with return values and parameters in response to the function call received from the ad campaign software. The parameters of the response may include an identification of the ad campaign (e.g., ad campaign 1.1), and features or functions of the ad campaign.

Figure 4:
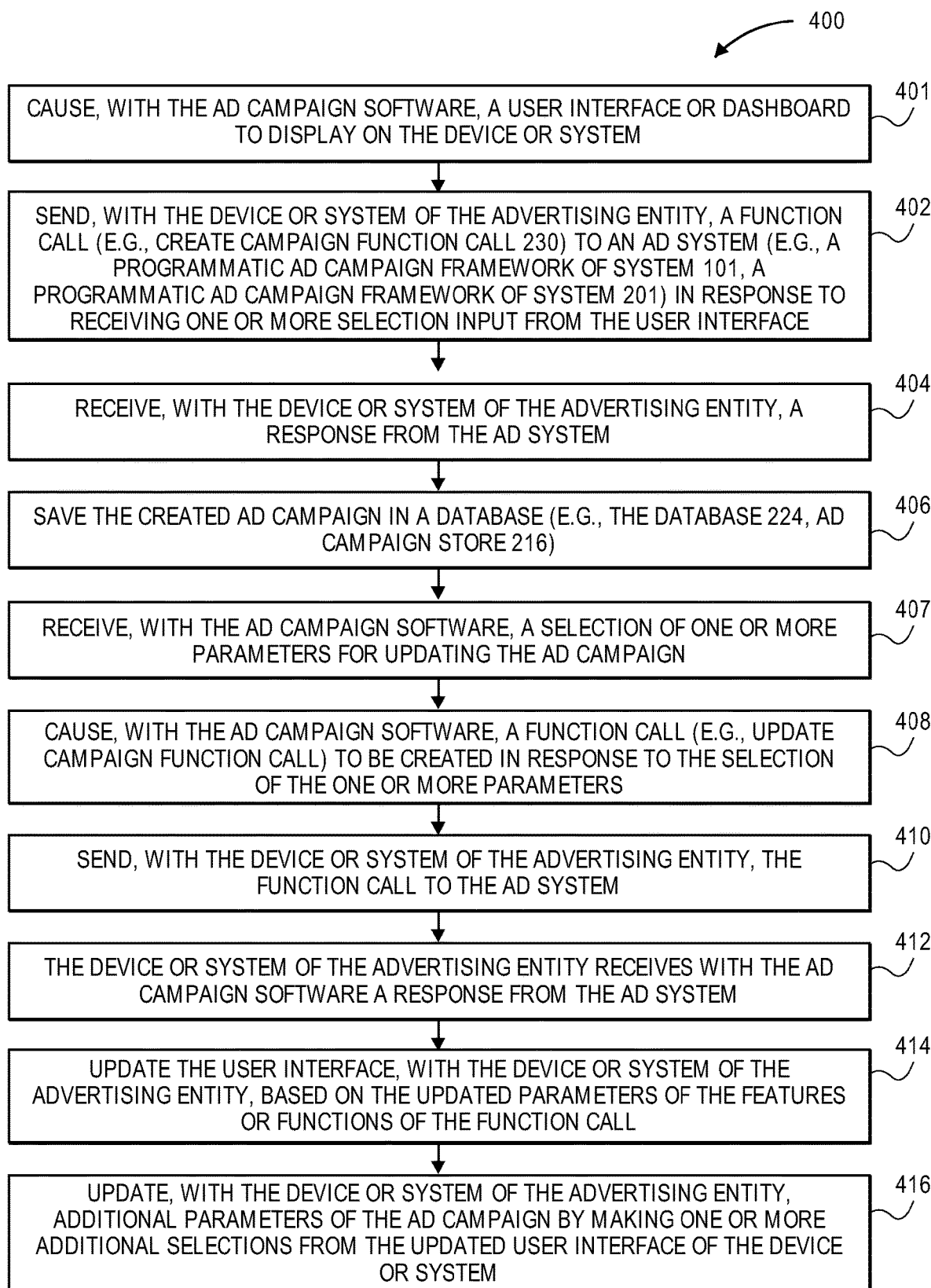
FIG. 4 illustrates a flow diagram of operations for a method of providing programmatic creation and modification of advertising campaigns via a network in accordance with one embodiment.

FIG. 4 illustrates a flow diagram of operations for a method of providing programmatic creation and modification of advertising campaigns via a network in accordance with one embodiment. The advertising operational flow of an ad system may be executed by an apparatus or system, which includes processing circuitry or processing logic. The processing logic may include hardware (circuitry, dedicated logic, etc.), software (such as is run on a general purpose computer system or a dedicated machine or a device), or a combination of both. In one embodiment, a device or system of an advertising entity executes instructions of an ad campaign software to perform at least some of the operations of method 400. The ad system communicates with an advertising entity via a network (e.g., network 180).

In one embodiment, an advertising entity uses ad campaign software (e.g., ad campaign software 222) installed on a device or a system for creating and modifying advertising campaigns (e.g., ad campaigns for delivering video ads to mobile devices, ad campaigns for delivering video ads to any type of device). The ad campaign software causes a user interface or dashboard to display on the device or system at operation 401. The user interface allows for customizing the ad campaign and for receiving one or more selection input of one or more different types of ad campaigns or one more parameters of the ad campaigns. For example, a user of the ad campaign software of the advertising entity selects one or more options for creating the ad campaign. The user can select an option to create a new ad campaign or the user can select an existing ad campaign possibly from a list or arrangement of existing ad campaigns to be used as a template for creating a customized ad campaign.

The device or system of the advertising entity sends a function call (e.g., create campaign function call 230) to an ad system (e.g., a programmatic ad campaign framework of system 101, a programmatic ad campaign framework of system 201) at operation 402 in response to receiving one or more selection input. The advertising entity may be using ad campaign software 222. The function call includes different parameters including an identification for identifying the advertising entity and an identification for identifying an ad campaign to be created. One or more APIs of a programmatic ad campaign framework of the ad system receives the function call. Parameters of the function call and data control information are transferred to one or more software components of the programmatic ad campaign framework. The one or more software components respond by providing a set of functionality for creating an ad campaign. The set of functionality may include an operating system (OS) type, cost information for a bid or cost type (e.g., $10 for CPI), a conversion rate for representing a likelihood of user ad interaction or conversion, a payer or non-payer category, an in-app purchase (IAP) parameter, an engagement rate, a threshold LTV (e.g., $50 threshold LTV, $100 threshold LTV) for targeting users having predicted life time values greater than the threshold LTV, a ROI function or parameter, etc. The device or system of the advertising entity receives a response from the ad system at operation 404. For example, the response is received from the one or more software components via the one or more APIs at operation 404.

The response includes one or more function calls with return values and parameters in response to the function call sent from the ad campaign software. The parameters of the response may include an identification of the ad campaign (e.g., ad campaign 1), and features or functions of the ad campaign. The created ad campaign can be saved in a database (e.g., the database 224, ad campaign store 216) at operation 406. The ad campaign may utilize ads from any source including database 224, an ad store 210, third party databases 297, etc.

The ad campaign software can also update an ad campaign in response to receiving a selection of one or more parameters at operation 407. The ad campaign software causes a function call (e.g., update campaign function call) to be created at operation 408 in response to the selection of one or more parameters. The device or system of the advertising entity sends the function call to the ad system at operation 410. One or more APIs of the programmatic ad campaign framework receives the function call from the ad campaign software 222. Parameters of the function call and data control information are transferred to the one or more software components. The one or more software components respond by providing a set of functionality for updating the ad campaign. The set of functionality to be updated may include an operating system (OS) type, cost information for a bid or cost type (e.g., $10 for CPI), a conversion rate for representing a likelihood of user ad interaction or conversion, a payer or non-payer category, an in-app purchase (IAP) parameter, an engagement rate, a threshold LTV (e.g., $50 threshold LTV, $100 threshold LTV) for targeting users having predicted life time values greater than the threshold LTV, a ROI function or parameter, etc. The system or device of the advertising entity receives with the ad campaign software a response from the ad system at operation 412. The one or more software components via the one or more APIs provide the response. The response includes one or more function calls with return values and parameters in response to the function call received from the ad campaign software. The parameters of the response may include an identification of the ad campaign (e.g., ad campaign 1.1), and features or functions of the ad campaign to be updated. The device or system of the advertising entity updates the user interface based on the updated parameters of the features or functions of the function call at operation 414. The user of the device or system can update additional parameters of the ad campaign by making one or more additional selections from the updated user interface of the device or system at operation 416.

FIG. 5 illustrates an exemplary user interface for programmatic creation of advertising campaigns in accordance with one embodiment. The user interface 500 occurs after an advertiser (or ad agency or publisher or developer) has initiated ad campaign software installed on a device or a system. The user interface 500 includes an ad campaign region 510 for selecting one or more ad campaigns (e.g., ad campaigns for delivering video ads to mobile devices, ad campaigns for delivering video ads to any type of device) including ad campaigns 512, 514, 516, 518, and n. Each ad campaign is associated with a selectable cost information option including cost information option 522, cost information option 524, cost information option 526, cost information option 528, and cost information option n. For example, cost information option 522 may be a $5 cost information for CPI on a certain OS type, cost information option 524 may be a $7 cost information for CPI on a certain OS type, cost information option 526 may be a $10 cost information for CPI on a certain OS type, cost information option 528 may be a $15 cost information for CPI on a certain OS type, and cost information option n may be a $20 cost information for CPI on a certain OS type. In another embodiment, the OS type is a separate function with selectable options.

The function 530 includes selectable conversion rate options 532, 534, 536, 538, and n. Each ad campaign is associated with one of the selected conversion rate options. For example, ad campaign 514 may target users having a predicted conversion rate of 30% or more while ad campaign 516 may target users having a predicted conversion rate of 40% or more. Function 540 includes an identification option 542 for identifying an advertiser (or ad agency, publisher, developer), a payer v. non-payer option 544, and IAP options 546, 548, and n. The payer or non-payer option indicates a type of user that the associated ad campaign will be targeting. For example, the ad campaign 514 may only target paying users based on the selection of payer option 544. The ad campaign 516 may only target users having IAP greater than $50 while the ad campaign 518 may only target users having IAP greater than $100. In one embodiment, the function 560 includes LTV options 562, 564, 566, 568, n for a threshold LTV (e.g., $30 threshold LTV for option 562, $50 threshold LTV for option 564, $100 threshold LTV for option 566, etc.) for targeting users having predicted life time values greater than the threshold LTV.

In one embodiment, the function n includes engagement rate options 552, 554, 556, 558, n. The engagement rate indicates how engaged a user is with an ad. For example, the ad campaign 512 may target users having a first engagement rate. The ad campaign 514 may target users having a second engagement rate. An advertising entity may be willing to pay a greater amount for users having a higher engagement rate. Function 570 includes return on investment ROI options 572, 574, 576, 578, and n for defining ROI objectives (e.g., 10-20% ROI) for each ad campaign. An ad campaign may include at least one of the LTV and ROI functions.

FIG. 6 illustrates an exemplary user interface for programmatic modification of advertising campaigns in accordance with one embodiment. The user interface 600 occurs after an advertising entity has initiated ad campaign software installed on a device or a system and decides to update one or more ad campaigns (e.g., ad campaigns for delivering video ads to mobile devices via a network, ad campaigns for delivering video ads to any type of device via a network). The user interface 600 includes an ad campaign region 610 for selecting one or more ad campaigns to be updated including ad campaigns 612, 614, 616, 618, and n. Each ad campaign is associated with a selectable cost information option including cost information option 622, cost information option 624, cost information option 626, cost information option 628, and cost information option n. For example, cost information option 622 may be a $5 cost for CPI on a certain OS type, cost information option 624 may be a $7 cost for CPI on a certain OS type, cost information option 626 may be a $10 cost for CPI on a certain OS type, cost information option 628 may be a $15 cost for CPI on a certain OS type, and cost information option n may be a $20 cost for CPI on a certain OS type. In another embodiment, the OS type is a separate function with selectable options. Any of these cost information options may be selected and modified to update the associated ad campaign.

In one embodiment, the function 630 includes selectable conversion rate options 632, 634, 636, 638, and n. Each ad campaign is associated with one of the selected conversion rate options. Function 640 includes an identification option 642 for identifying an advertiser (or ad agency, publisher, developer), a payer v. non-payer option 644, and IAP options 646, 648, and n. The payer or non-payer option indicates a type of user that the associated ad campaign will be targeting. For example, the ad campaign 614 may only target paying users based on the selection of payer option 644. The ad campaign 616 may only target users having IAP greater than $50 while the ad campaign 618 may only target users having IAP greater than $100.

In one embodiment, the function 660 includes LTV options 662, 664, 666, 668, n for a threshold LTV (e.g., $30 threshold LTV for option 662, $50 threshold LTV for option 664, $100 threshold LTV for option 666, etc.) for targeting users having predicted life time values greater than the threshold LTV. Function 670 includes return on investment ROI options 672, 674, 676, 678, and n for defining ROI objectives (e.g., 10-20% ROI) for each ad campaign. An ad campaign may include at least one of the LTV and ROI functions.

In one embodiment, the conversion rate option 634 of ad campaign 614, which corresponds to ad campaign 514 of FIG. 5, is selected as indicated by the shading in FIG. 6. The advertising entity can then change the conversion rate from its current value (e.g., 30% or more) to any other predetermined or custom settings or values (e.g., conversion rate of 35% or more). In another embodiment, the cost information option 626 and IAP option 646 are selected as indicated by the shading in FIG. 6. These functions are updated for the ad campaign 616. The advertising entity can change the cost information from its current value (e.g., $10 CPI) to any other predetermined or custom settings or values (e.g., $12 CPI, $1 CPC, etc.). The advertising entity can also change the IAP option 646 from its current value (e.g., IAP greater than $50) to any other predetermined, custom setting, or value (e.g., IAP greater than $50, etc.).

In one embodiment, the function n includes engagement rate options 652, 654, 656, 658, n. The engagement rate indicates how engaged a user is with an ad in terms of cognitive (e.g., awareness, interest), physical (e.g., user-initiated transaction), and emotional factors. In one example, engagement with an ad video is measured in terms of play rate, playthrough rate, completion rates, video viewing time, and share rates. In another example, rich media engagement is measured in terms of display times, expansions, expansion times, interaction time and rate, form responses, game play, and share rates. In another example for mobile devices, engagement includes click to call, retail location, interaction rates, click to download, click to play, and share rates. For example, the ad campaign 612 may target users having a first engagement rate. The ad campaign 614 may target users having a second engagement rate. An advertiser may change an engagement rate for one or more engagement rate options.

In another example, closing a video ad at an earliest opportunity can be interpreted as a negative emotion in regards to the video ad. A user's interaction with hardware (e.g., display device, motion device, gyroscope, accelerometer, smart watch, heart rate monitor, blood pressure sensor, etc.) may also be used to infer an emotional state of the user. For example, a user can interact with an interactive end card of an ad campaign by touching numerous touch points on a display device of a device to indicate an emotional state. A user can move the device in a certain shape or pattern that can be detected by a motion device.

Figure 7:
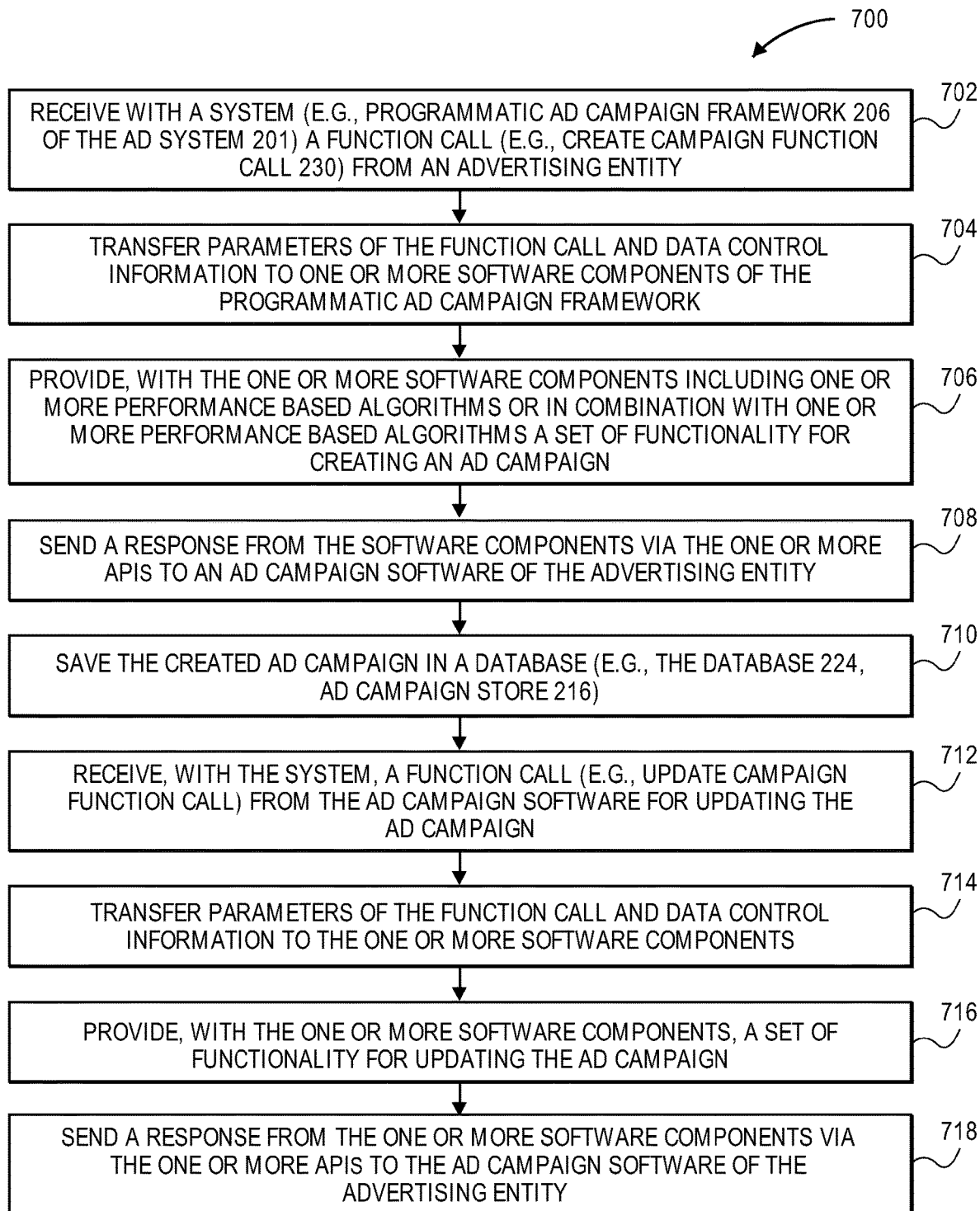
FIG. 7 illustrates a flow diagram of operations for a method of creating and modifying programmatic advertising campaigns with advanced targeting in accordance with one embodiment.

FIG. 7 illustrates a flow diagram of operations for a method of creating and modifying programmatic advertising campaigns with advanced targeting in accordance with one embodiment. The advertising operational flow of an ad system may be executed by an apparatus or system, which includes processing circuitry or processing logic. The processing logic may include hardware (circuitry, dedicated logic, etc.), software (such as is run on a general purpose computer system or a dedicated machine or a device), or a combination of both. In one embodiment, an ad system performs the operations of method 700 by executing instructions of at least one of software components, APIs, and one or more performance based algorithms with advanced targeting. The ad system communicates with an advertising entity via a network (e.g., network 180).

An advertising entity (e.g., advertiser, ad agency, publisher, developer, etc.) 220 uses ad campaign software 222 to access the programmatic ad campaign framework for creating and modifying advertising campaigns (e.g., ad campaigns for delivering video ads to mobile devices, ad campaigns for delivering video ads to any type of device). The ad campaign software provides a user interface for entering one or more parameters. The advertising entity enters one or more parameters including an advertising cost budget for an ad campaign. An ad system (e.g., programmatic ad campaign framework 207 of the ad system 201) receives a function call (e.g., create campaign function call 230) from the advertising entity at operation 702. The advertising entity may be using ad campaign software 222. The function call includes different parameters including an identification for identifying the advertising entity, an ad advertising cost budget for an ad campaign, and optionally an identification for identifying an ad campaign to be created. One or more APIs of the programmatic ad campaign framework of the system receives the function call. Parameters of the function call and data control information are transferred to one or more software components of the programmatic ad campaign framework at operation 704. The software component(s) include one or more performance based algorithms or in combination with one or more performance based algorithms respond by providing a set of functionality for creating an ad campaign at operation 706. The set of functionality may include any type of user characteristic or device characteristic for advanced targeting. In one embodiment, the functionality includes device characteristics (e.g., device id, device age, OS type, network connection for user's device, whether user's device is mobile device or tablet device, volume, screen size and orientation, language setting) and user characteristics (e.g., user spend, conversion rate, engagement rate, app type, IAP activity, etc.) from any source including the system 100, attributers 186, advertisers 184, and publishers 182. A response is sent from the software component(s) via the one or more APIs to the ad campaign software of the advertising entity at operation 708.

The response includes one or more function calls with return values and parameters in response to the function call received from the ad campaign software. The parameters of the response may include an identification of the ad campaign (e.g., ad campaign 1), and features or functions of the ad campaign. The ad campaign software will display a user interface or dashboard for customizing the ad campaign. The created ad campaign can be saved in a database (e.g., the database 224, ad campaign store 216) at operation 710. The ad campaign may utilize ads from any source including database 224, an ad store 210, third party databases 297, etc.

The system can also optionally update an ad campaign at operation 712 by receiving a function call (e.g., update campaign function call) from the ad campaign software of an advertising entity. One or more APIs of the programmatic ad campaign framework receives the function call from the ad campaign software 222. Parameters of the function call and data control information are transferred to the one or more software components at operation 714. The one or more software components respond by providing a set of functionality for updating the ad campaign at operation 716. The set of functionality to be updated may include any of the parameters discuss herein. A response is sent from the one or more software components via the one or more APIs to the ad campaign software at operation 718. The response includes one or more function calls with return values and parameters in response to the function call received from the ad campaign software. The parameters of the response may include an identification of the ad campaign (e.g., ad campaign 1.1), and features or functions of the ad campaign.

Figure 8:
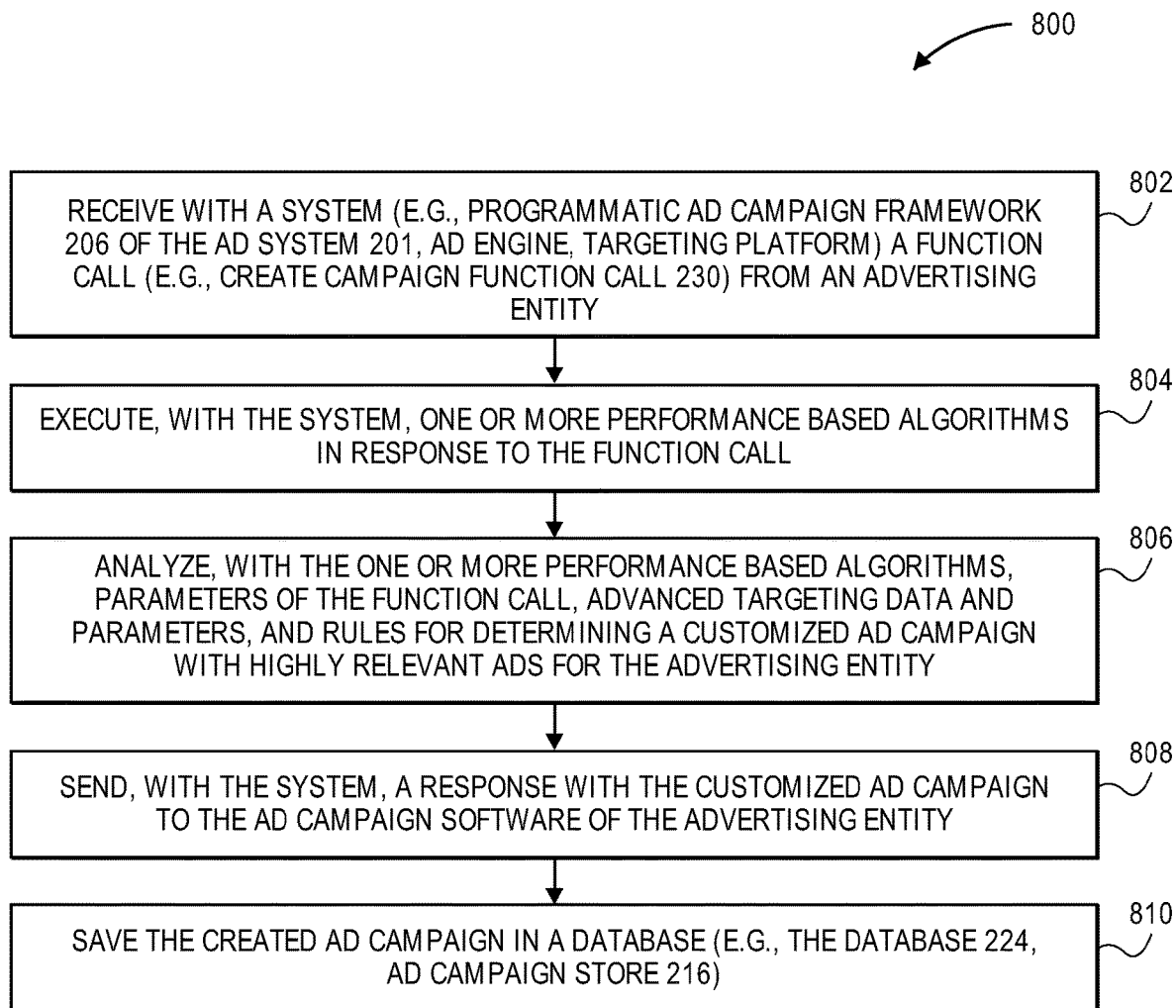
FIG. 8 illustrates a flow diagram of operations for a method of programmatically determining a customized advertising campaign with advanced targeting in accordance with one embodiment.

FIG. 8 illustrates a flow diagram of operations for a method of programmatically determining a customized advertising campaign with advanced targeting in accordance with one embodiment. The advertising operational flow of an ad system may be executed by an apparatus or system, which includes processing circuitry or processing logic. The processing logic may include hardware (circuitry, dedicated logic, etc.), software (such as is run on a general purpose computer system or a dedicated machine or a device), or a combination of both. In one embodiment, a system performs the operations of method 800 by executing instructions of one or more performance based algorithms with advanced targeting. The one or more performance based algorithms may be located in an ad system. The ad system communicates with an advertising entity via a network (e.g., network 180).

An advertising entity (e.g., advertiser, ad agency, publisher, developer, etc.) 220 uses ad campaign software 222 to access an ad system having the programmatic ad campaign framework for creating and modifying advertising campaigns (e.g., ad campaigns for delivering video ads to mobile devices, ad campaigns for delivering video ads to any type of device). The ad campaign software provides a user interface for entering one or more parameters. The advertising entity enters one or more parameters including an advertising cost budget for an ad campaign. A system (e.g., programmatic ad campaign framework 207 of the ad system 201, ad engine, targeting platform) receives a function call (e.g., create campaign function call 230) from the advertising entity at operation 802. The advertising entity may be using ad campaign software 222. The function call includes different parameters including an identification for identifying the advertising entity, an advertising cost budget for an ad campaign, and optionally an identification for identifying an ad campaign to be created. The system executes the one or more performance based algorithms in response to the function call at operation 804. The one or more performance based algorithms analyze parameters of the function call, advanced targeting data and parameters, and rules for determining a customized ad campaign with highly relevant ads for the advertising entity at operation 806. The rules may include variable rate performance such as a return on investment (ROI) parameter (e.g., 10-20% ROI) or function for the ad campaign based on the advertising cost budget. The advanced targeting data and parameters may include device characteristics (e.g., device id, device age, network connection for user's device, whether user's device is mobile device or tablet device, OS version, volume, screen size and orientation, language setting) and user characteristics (e.g., user spend, conversion rate, engagement rate, app type, IAP activity, predicted user LTV, etc.) from any source including the system 100, attributers 186, advertisers 184, and publishers 182. The conversion rate may be used to divide users into different groups based on the predicted conversion rate for each user. A category conversion rate can indicate how likely a conversion occurs for a user with a particular app category (e.g., sports games, war games, quest games, news content apps, restaurant apps, fashion apps, travel apps, business apps, etc.). An engagement rate is used to target users having a high ad engagement during ad play events. An app type may target users having competitor apps installed or users that have a particular "X" app installed. The competitor apps are competitors of publishers or developers that want to advertise to users of the competitor apps. The IAP activity targets users with IAP activity as indicated by user data from the system's 100 data pipeline. Users with IAP activity can be separated into groups based on spend ranges (e.g., $10-50 range, $50-100 range, $100 or more range, etc.). The device age can be used to target new devices (i.e., devices that are new with respect to the system 100 or recently associated with system 100). Additional parameters include segments of users such as non-payers versus payers, social influence based on social media data, organic app installs for a user, and life time value (LTV) of a user. The targeting platform of the ad system provides improved computer targeting functionality for supporting advertisers, developers, and publishers having complex bid strategies for their user acquisition ad campaigns. The targeting platform is able to target an individual user having specific device and user characteristics as defined programmatically by an ad campaign. A response with the customized ad campaign is sent from the ad system (e.g., software component(s) via the one or more APIs) to the ad campaign software of the advertising entity at operation 808. The response includes one or more function calls with return values and parameters in response to the function call received from the ad campaign software. The parameters of the response may include an identification of the ad campaign (e.g., ad campaign 1), and features or functions of the ad campaign. The ad campaign software will display a user interface or dashboard for customizing the ad campaign. The created ad campaign can be saved in a database (e.g., the database 224, ad campaign store 216) at operation 810. The ad campaign may utilize ads from any source including database 224, an ad store 210, third party databases 297, etc.

Figure 9:
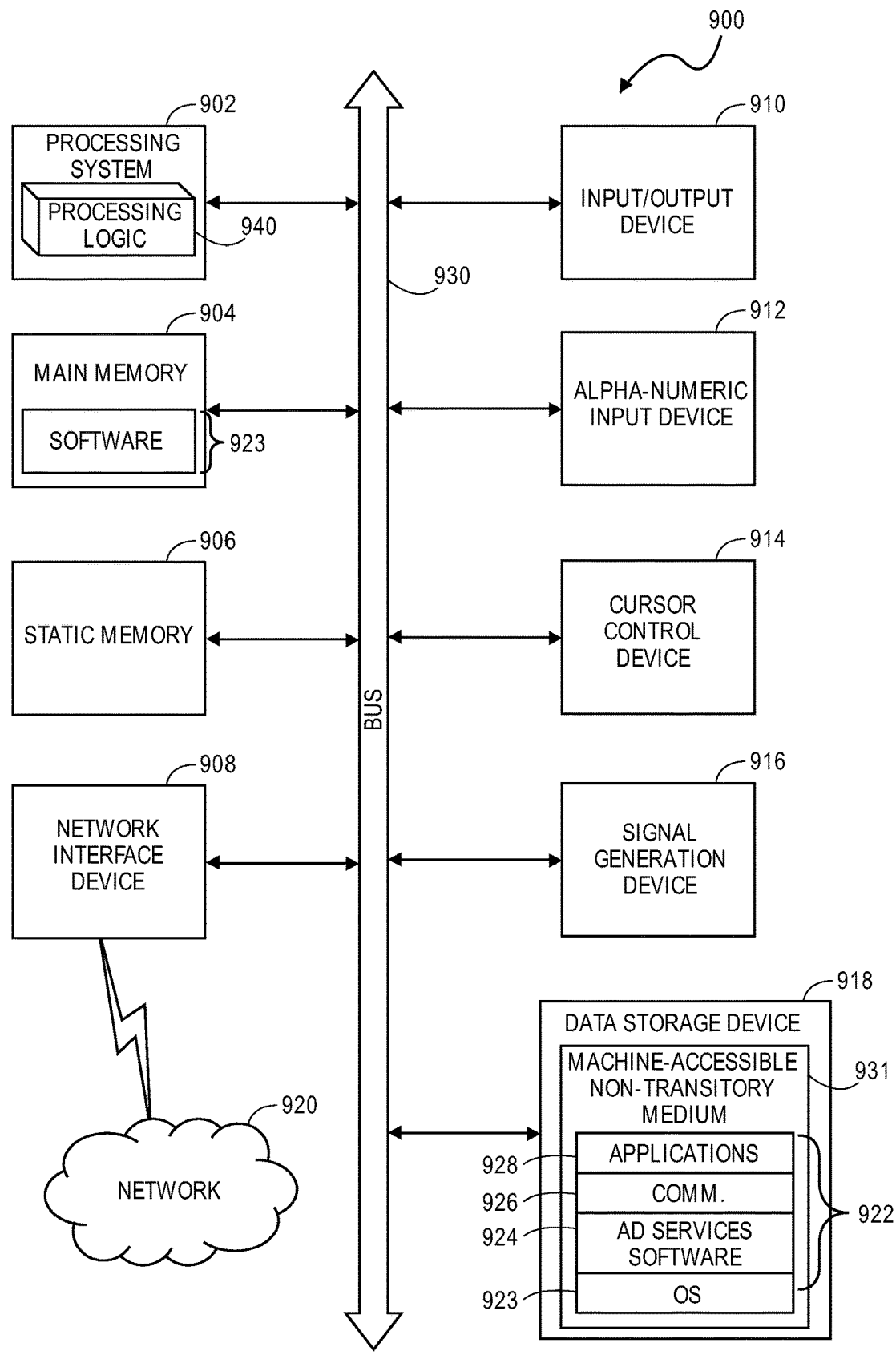
FIG. 9 illustrates a diagrammatic representation of a machine in the exemplary form of a device 900 within which a set of instructions, for causing the machine to perform any one or more of the methodologies discussed herein, may be executed in accordance with one embodiment.

FIG. 9 illustrates a diagrammatic representation of a machine in the exemplary form of a computer system or device 900 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a mobile device, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary device 900 includes a processing system 902, a main memory 904 (e.g., read-only memory (ROM), flash memory, dynamic random access memory (DRAM) such as synchronous DRAM (SDRAM) or Rambus DRAM (RDRAM), etc.), a static memory 906 (e.g., flash memory, static random access memory (SRAM), etc.), and a data storage device 918, which communicate with each other via a bus 930.

Processing system 902 represents one or more general-purpose processing devices such as one or more microprocessors, central processing units, or the like. More particularly, the processing system 902 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing system 902 may also be one or more special-purpose processing devices such as an application specific integrated circuit (ASIC), a field programmable gate array (FPGA), a digital signal processor (DSP), network processor, or the like. The processing system 902 is configured to execute the processing logic 926 for performing the operations and steps discussed herein.

The device 900 may further include a network interface device 908 that may include RF circuitry for sending and receiving RF cellular signals, a wireless transceiver for WiFi, a USB component, a NFC component, or any other communications component for sending and receiving communications via a network 920. The device 900 also may include an input/output device 910 (e.g., a display, a liquid crystal display (LCD), a plasma display, a cathode ray tube (CRT), touch display device, or touch screen for receiving user input and displaying output), an optional alphanumeric input device 912 (e.g., a keyboard), an optional cursor control device 914 (e.g., a mouse), and a signal generation device 916 (e.g., a speaker).

The data storage device 918 may include a machine-accessible non-transitory medium 931 on which is stored one or more sets of instructions (e.g., software 922) embodying any one or more of the methodologies or functions described herein. The software 922 may include an operating system 923, advertising services software 924 (e.g., SDK 924), communications module 926, and applications 928 (e.g., publisher applications). The software 922 may also reside, completely or at least partially, within the main memory 904 (e.g., software 923) and/or within the processing system 902 during execution thereof by the device 900, the main memory 904 and the processing system 902 also constituting machine-accessible storage media. The software 922 or 923 may further be transmitted or received over the network 920 via the network interface device 908.

The machine-accessible non-transitory medium 931 may also be used to store data structure sets that define user identifying states and user preferences that define user profiles. Data structure sets and user profiles may also be stored in other sections of device 900, such as static memory 906.

Figure 10:
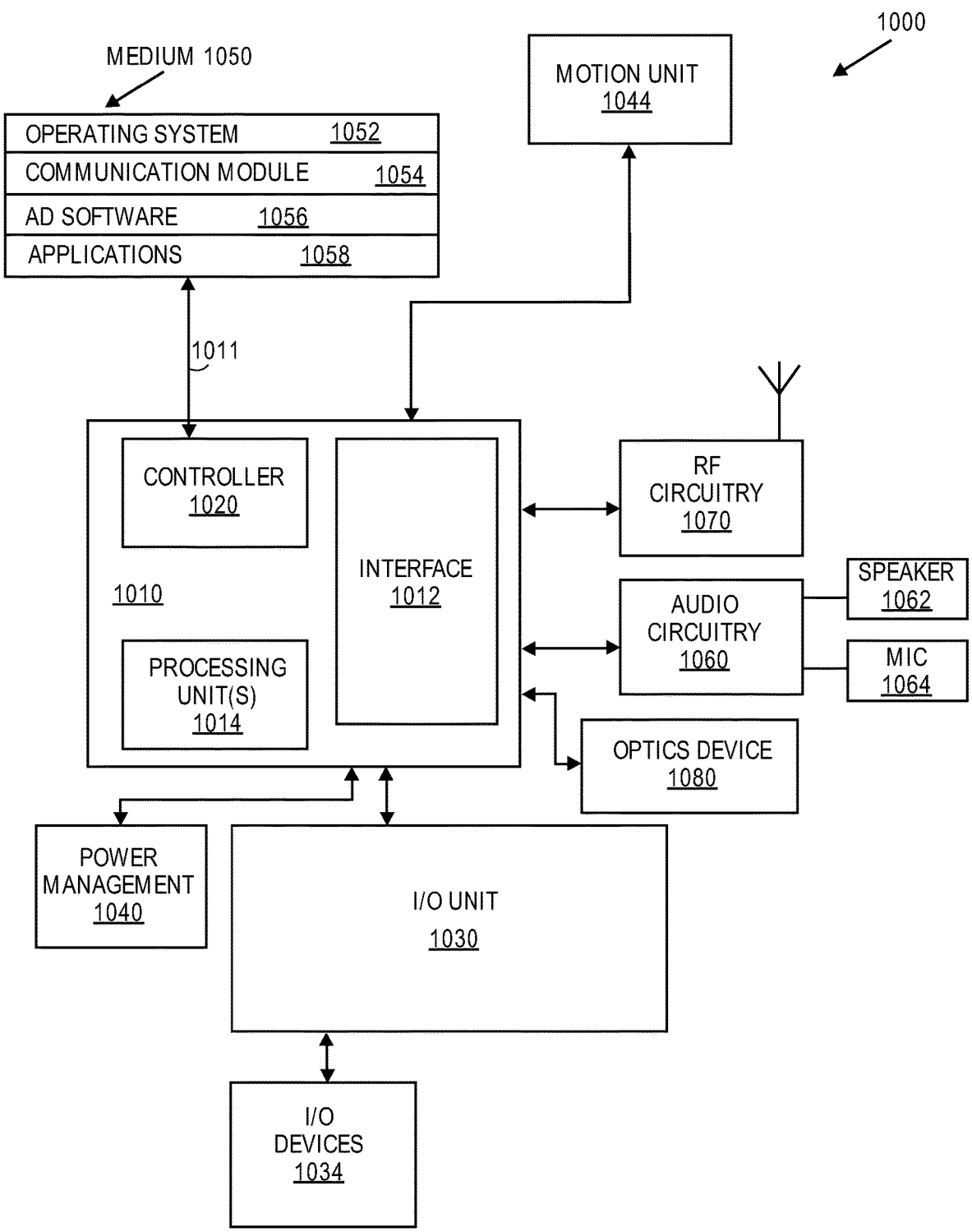
FIG. 10 is a block diagram of a wireless device 1000 in accordance with one embodiment.

FIG. 10 is a block diagram of a wireless device 1000 in accordance with one embodiment. The wireless device 1000 may be any type of wireless device (e.g., cellular phone, wireless phone, tablet, etc.) for sending and receiving wireless communications. The wireless device includes a processing system 1010 that includes a controller 1020 and processing units 1014. The processing system 1010 communicates with an Input/Output (I/O) unit 1030, radio frequency (RF) circuitry 1070, audio circuitry 1060, an optics device 1060 for capturing one or more images or video, a motion unit 1044 (e.g, an accelerometer, gyroscope, etc.) for determining motion data (e.g., in three dimensions) for the wireless device 1000, power management system 1040, and machine-accessible non-transitory medium 1050. These components are coupled by one or more communication links or signal lines.

RF circuitry 1070 is used to send and receive information over a wireless link or network to one or more other devices. Audio circuitry 1060 is coupled to audio speaker 1062 and microphone 1064 and includes known circuitry for processing voice signals.

One or more processing units 1014 communicate with one or more machine-accessible non-transitory mediums 1050 (e.g., computer-readable medium) via controller 1020. Medium 1050 can be any device or medium (e.g., storage device, storage medium) that can store code and/or data for use by one or more processing units 1014. Medium 1050 can include a memory hierarchy, including but not limited to cache, main memory and secondary memory. The medium 1050 stores one or more sets of instructions (or software) embodying any one or more of the methodologies or functions described herein. The software may include an operating system 1052, advertising services software 1056 (e.g., SDK 1056), communications module 1054, and applications 1058 (e.g., publisher applications, developer applications, a web browser, html5 applications, etc.). The software may also reside, completely or at least partially, within the medium 1050 or within the processing units 1014 during execution thereof by the device 1000. The components shown in FIG. 10 may be implemented in hardware, software, firmware or any combination thereof, including one or more signal processing and/or application specific integrated circuits.

Communication module 1054 enables communication with other devices. The I/O unit 1030 communicates with different types of input/output (I/O) devices 1034 (e.g., a display, a liquid crystal display (LCD), a plasma display, a cathode ray tube (CRT), touch display device, or touch screen for receiving user input and displaying output, an optional alphanumeric input device).

In one embodiment, a machine-accessible non-transitory medium contains executable computer program instructions which when executed by a data processing system cause the system to perform any of the methods discussed herein. While the machine-accessible non-transitory medium 1050 is shown in an exemplary embodiment to be a single medium, the term "machine-accessible non-transitory medium" should be taken to include a single medium or multiple media (e.g., a centralized or distributed database, and/or associated caches and servers) that store the one or more sets of instructions. The term "machine-accessible non-transitory medium" shall also be taken to include any medium that is capable of storing, encoding or carrying a set of instructions for execution by the machine and that cause the machine to perform any one or more of the methodologies of the present invention. The term "machine-accessible non-transitory medium" shall accordingly be taken to include, but not be limited to, solid-state memories, optical and magnetic media.

In one embodiment, a system for advanced targeting of devices for ad delivery includes a storage medium to store instructions of one or more performance based algorithms and processing logic coupled to the storage medium. In response to receiving a function call from an advertising entity the processing logic is configured to execute the instructions of the one or more performance based algorithms to analyze parameters of the function call including an advertising cost budget for an ad campaign and analyze advanced targeting data and parameters and rules for determining a customized ad campaign for the advertising entity. The advanced targeting data and parameters include device characteristics and user characteristics including at least two of conversion rate, ad engagement rate, installed software application (app) type on a user's device, and in-app purchase (IAP) activity of a user from any ad source.

In one example, the device characteristics include device identification and device age with respect to a time period in which the device is identified by the system. The conversion rate is used to divide users into different groups based on the predicted conversion rate for the users. An ad category conversion rate indicates a probability for a conversion occurring for a user for a particular app category. The app type may target users having competitor apps installed or users that have a particular application installed. The rules include a return on investment (ROI) parameter for the ad campaign based on the advertising cost budget. The ad campaign delivers video ads in-app (i.e., within initiated software applications of mobile devices) to users of mobile devices via a network.

In one embodiment, a machine-accessible non-transitory medium containing executable computer program instructions which when executed by a system cause the system to perform a method for advanced targeting of devices for ad delivery. The method includes receiving, with a system, a function call from ad campaign software of an advertising entity and executing one or more performance based algorithms to analyze parameters of the function call including an advertising cost budget for an ad campaign, analyze advanced targeting data, parameters, and rules for determining a customized ad campaign for the advertising entity. The advanced targeting data and parameters include device characteristics and user characteristics including at least two of conversion rate, ad engagement rate, installed software application (app) type, ROI, LTV, and in-app purchase (IAP) activity from any ad source.

In one example, the device characteristics include device identification and device age with respect to a time period in which the device identified by the system. The conversion rate is used to divide users into different groups based on the predicted conversion rate for the users. An ad category conversion rate indicates a probability for a conversion occurring for a user for a particular app category. The app type may target users having competitor apps installed or users that have a particular "X" app installed. In one example, the rules include a return on investment (ROI) parameter for the ad campaign based on the advertising cost budget, wherein the ad campaign delivers video ads in-app (i.e., within initiated software applications of mobile devices) to users of mobile devices via a network.

In one embodiment, a method for programmatically determining a customized advertising campaign with advanced targeting includes receiving, with a system, a function call from ad campaign software of an advertising entity and executing one or more performance based algorithms to analyze parameters of the function call including an advertising cost budget for an ad campaign, analyze advanced targeting data, parameters, and rules for determining a customized ad campaign for the advertising entity. The advanced targeting data and parameters include device characteristics and user characteristics including at least two of conversion rate, ad engagement rate, installed software application (app) type, ROI, LTV, and in-app purchase (IAP) activity from any ad source.

In one example, the device characteristics include device identification and device age with respect to a time period in which the device identified by the system. The conversion rate is used to divide users into different groups based on the conversion rate for the users. An ad category conversion rate indicates a probability for a conversion occurring for a user for a particular app category.

The app type may target users having competitor apps installed or users that have a particular "X" app installed. In one example, the rules include a return on investment (ROI) parameter for the ad campaign based on the advertising cost budget, wherein the ad campaign delivers video ads in-app (i.e., within initiated software applications of mobile devices) to users of mobile devices via a network.

In one embodiment, a system for advanced targeting of devices for ad delivery includes an advertising campaign framework having one or more application programming interfaces (APIs) and software components including one or more software programs and software code libraries, a storage medium to store instructions of the one or more APIs, software components, and at least one performance based algorithm, and processing logic coupled to the storage medium. The processing logic is configured to execute the instructions to receive a function call from an advertising entity for creating an advertising (ad) campaign, analyze parameters of the function call including an advertising cost budget for the ad campaign, and analyze advanced targeting data, parameters, and rules for determining the ad campaign for the advertising entity. The advanced targeting data and parameters include device characteristics and user characteristics including at least two of conversion rate, ad engagement rate, installed software application (app) type, ROI, LTV, and in-app purchase (IAP) activity from any ad source.

The device characteristics include device identification and device age with respect to a time period in which the device is identified by the system. The conversion rate is used to divide users into different groups based on the predicted conversion rate for the users. An ad category conversion rate indicates a probability for a conversion occurring for a user for a particular app category.

The app type may target users having competitor apps installed or users that have a particular "X" app installed. The rules include a return on investment (ROI) parameter for the ad campaign based on the advertising cost budget. The ad campaign delivers video ads in-app (i.e., within initiated software applications of mobile devices) to users of mobile devices via a network.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A system for advanced programmatic targeting of wireless devices including mobile devices and tablet devices for ad delivery, comprising:
   a programmatic advertising campaign framework having one or more application programming interfaces (APIs) and software components including one or more performance based algorithms;
   a non-transitory storage medium to store instructions of the one or more application programming interfaces (APIs) and software components including the one or more performance based algorithms; and
   processing logic including a hardware processor that is coupled to the storage medium, the hardware processor is configured to execute the instructions of the one or more application programming interfaces (APIs) and software components including the one or more performance based algorithms to:
   receive, with the system, a function call from an advertising entity;
   analyze parameters of the function call including an advertising cost budget for an ad campaign;
   analyze advanced targeting data and parameters and rules for determining a customized ad campaign for the advertising entity;
   receive, with the system, an update campaign function call to modify a user ad engagement rate from a first ad engagement rate to a second ad engagement rate, wherein the user ad engagement rate for an in-app video ad within non-web browser applications of mobile devices or tablet devices is measured in terms of play rate, playthrough rate, completion rates, video viewing time, and share rates, wherein the advanced targeting data and parameters include device characteristics and user characteristics including in-app purchase (IAP) activity within the non-web browser applications of mobile devices or tablet devices of a user from any ad source, different conversion rates for representing a likelihood of conversion for different groups of users, the first and second ad engagement rates to indicate a level of user engagement with in-app video ads within non-web browser applications of mobile devices or tablet devices during an ad play event on wireless devices of users, wherein the mobile device and tablet device characteristics for targeting wireless devices of users include different operating system types, volume settings, bandwidth of a wireless network connection for a user's mobile device or tablet device, whether user's wireless device is a mobile device or a tablet device, screen size and orientation for the mobile and tablet devices, mobile or tablet device identification, and mobile device or tablet device age to target mobile and tablet wireless devices that are new with respect to the system or recently associated with the system with the device age being a time period in which the mobile device or tablet device is identified by the system.

2. The system of claim 1, wherein the device characteristics for targeting wireless devices of users include volume, screen size and orientation, language setting, device identification and device age with respect to a time period in which the device is identified by the system, wherein the user characteristics for targeting wireless devices of users include user spend and app type.

3. The system of claim 1, wherein the conversion rate is used to divide users into different groups based on the conversion rate for the users, wherein an ad category conversion rate indicates a probability for a conversion occurring for a user of a device for a particular app category.

4. The system of claim 1, wherein the app type may target users having competitor apps installed on their devices or users that have a particular application installed on their devices.

5. The system of claim 1, wherein the rules include a return on investment (ROI) parameter for the ad campaign based on the advertising cost budget, wherein the ad campaign delivers video ads to users of mobile devices.

6. A machine-accessible non-transitory storage medium containing executable computer program instructions which when executed by a system cause the system to perform a method for advanced programmatic targeting of devices including mobile devices and tablet devices for ad delivery, the method comprising:
  receiving, with a programmatic advertising campaign framework having one or more application programming interfaces (APIs) and software components including one or more performance based algorithms of the system, a function call from ad campaign software of an advertising entity;
  executing one or more performance based algorithms to analyze parameters of the function call including an advertising cost budget for an ad campaign, analyze advanced targeting data, parameters, and rules for determining a customized ad campaign for the advertising entity;
  receiving, with the system, an update campaign function call to modify a user ad engagement rate from a first ad engagement rate to a second ad engagement rate, wherein the user ad engagement rate for an in-app video ad within non-web browser applications of mobile devices or tablet devices is measured in terms of play rate, playthrough rate, completion rates, video viewing time, and share rates, wherein the advanced targeting data and parameters include device characteristics and user characteristics including in-app purchase (IAP) activity within the non-web browser applications of mobile devices or tablet devices of a user from any ad source, different conversion rates for representing a likelihood of conversion for different groups of users, the first and second ad engagement rates to indicate a level of user engagement with in-app video ads within non-web browser applications of mobile devices or tablet devices during an ad play event on wireless devices of users, wherein the mobile device and tablet device characteristics for targeting wireless devices of users include different operating system types, volume settings, bandwidth of a wireless network connection for a user's mobile device or tablet device, whether user's wireless device is a mobile device or a tablet device, screen size and orientation for the mobile and tablet devices, mobile or tablet device identification, and mobile device or tablet device age to target mobile and tablet wireless devices that are new with respect to the system or recently associated with the system with the device age being a time period in which the mobile device or tablet device is identified by the system.

7. The machine-accessible non-transitory storage medium of claim 6, wherein the device characteristics include device identification and device age with respect to a time period in which the device identified by the system, wherein the user characteristics for targeting wireless devices of users include user spend and app type.

8. The machine-accessible non-transitory storage medium of claim 6, wherein the conversion rate is used to divide users into different groups based on the conversion rate for the users, wherein an ad category conversion rate indicates a probability for a conversion occurring for a user for a particular app category.

9. The machine-accessible non-transitory storage medium of claim 6, wherein the app type may target users having competitor apps installed or users that have a particular app installed.

10. The machine-accessible non-transitory storage medium of claim 6, wherein the rules include a return on investment (ROI) parameter for the ad campaign based on the advertising cost budget, wherein the ad campaign delivers video ads to users of mobile devices.

11. A method for programmatically determining a customized advertising campaign with advanced programmatic targeting, comprising:
  receiving, with a programmatic advertising campaign framework having one or more application programming interfaces (APIs) and software components including one or more performance based algorithms of a system, a function call from ad campaign software of an advertising entity; and
  executing one or more performance based algorithms to analyze parameters of the function call including an advertising cost budget for an ad campaign, analyze advanced targeting data, parameters, and rules for determining a customized ad campaign for the advertising entity, wherein the advanced targeting data and parameters include device characteristics and user characteristics including in-app purchase (IAP) activity within the non-web browser applications of mobile devices or tablet devices of a user from any ad source, different conversion rates for representing a likelihood of conversion for different groups of users, the first and second ad engagement rates to indicate a level of user engagement with in-app video ads within non-web browser applications of mobile devices or tablet devices during an ad play event on wireless devices of users, wherein the mobile device and tablet device characteristics for targeting wireless devices of users include different operating system types, volume settings, bandwidth of a wireless network connection for a user's mobile device or tablet device, whether user's wireless device is a mobile device or a tablet device, screen size and orientation for the mobile and tablet devices, mobile or tablet device identification, and mobile device or tablet device age to target mobile and tablet wireless devices that are new with respect to the system or recently associated with the system with the device age being a time period in which the mobile device or tablet device is identified by the system.

12. The method of claim 11, wherein the device characteristics include device identification and device age with respect to a time period in which the device is identified by the system, wherein the user characteristics for targeting wireless devices of users include user spend and app type.

13. The method of claim 11, wherein the conversion rate is used to divide users into different groups based on the conversion rate for the users, wherein an ad category conversion rate indicates a probability for a conversion occurring for a user for a particular app category.

14. The method of claim 11, wherein the app type may target users having competitor apps installed or users that have a particular app installed.

15. The method of claim 11, wherein the rules include a return on investment (ROI) parameter for the ad campaign based on the advertising cost budget, wherein the ad campaign delivers video ads to users of mobile devices.

16. A system for advanced programmatic targeting of devices for ad delivery, comprising:

an advertising campaign framework having one or more application programming interfaces (APIs) and software components including one or more software programs and software code libraries;
a non-transitory storage medium to store instructions of the one or more APIs, software components, and at least one performance based algorithm; and
processing logic including a hardware processor that is coupled to the storage medium, the hardware processor is configured to execute the instructions to:
receive a function call from an advertising entity for creating an advertising (ad) campaign;
analyze parameters of the function call including an advertising cost budget for the ad campaign; and
analyze advanced targeting data, parameters, and rules for determining the ad campaign for the advertising entity, wherein the advanced targeting data and parameters include device characteristics and user characteristics including in-app purchase (IAP) activity within the non-web browser applications of mobile devices or tablet devices of a user from any ad source, different conversion rates for representing a likelihood of conversion for different groups of users, the first and second ad engagement rates to indicate a level of user engagement with in-app video ads within non-web browser applications of mobile devices or tablet devices during an ad play event on wireless devices of users, wherein the mobile device and tablet device characteristics for targeting wireless devices of users include different operating system types, volume settings, bandwidth of a wireless network connection for a user's mobile device or tablet device, whether user's wireless device is a mobile device or a tablet device, screen size and orientation for the mobile and tablet devices, mobile or tablet device identification, and mobile device or tablet device age to target mobile and tablet wireless devices that are new with respect to the system or recently associated with the system with the device age being a time period in which the mobile device or tablet device is identified by the system.

17. The system of claim 16, wherein the device characteristics include device identification and device age with respect to a time period in which the device is identified by the system, wherein the user characteristics for targeting wireless devices of users include user spend and app type.

18. The system of claim 16, wherein the conversion rate is used to divide users into different groups based on the conversion rate for the users, wherein an ad category conversion rate indicates a probability for a conversion occurring for a user for a particular app category.

19. The system of claim 16, wherein the app type may target users having competitor apps installed or users that have a particular app installed.

20. The system of claim 16, wherein the rules include a return on investment (ROI) parameter for the ad campaign based on the advertising cost budget, wherein the ad campaign delivers video ads to users of mobile devices.

* * * * *